United States Patent
Stevenson

(10) Patent No.: US 8,587,614 B2
(45) Date of Patent: Nov. 19, 2013

(54) SYSTEM AND METHOD FOR IMAGE EDITING OF ELECTRONIC PRODUCT DESIGN

(75) Inventor: Martijn Stevenson, Cambridge, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 1402 days.

(21) Appl. No.: 11/953,633

(22) Filed: Dec. 10, 2007

(65) Prior Publication Data

US 2009/0147297 A1 Jun. 11, 2009

(51) Int. Cl.
*G09G 5/00* (2006.01)

(52) U.S. Cl.
USPC .............................. 345/622; 345/619; 345/660

(58) Field of Classification Search
USPC ............ 715/274, 722, 804; 709/203; 358/1.2, 358/1.1; 345/619, 622, 660, 629
See application file for complete search history.

(56) References Cited

U.S. PATENT DOCUMENTS

| | | |
|---|---|---|
| 2002/0030634 A1 | 3/2002 | Noda et al. |
| 2003/0055871 A1* | 3/2003 | Roses ........................... 709/203 |
| 2004/0190011 A1* | 9/2004 | Walker, Jr. ...................... 358/1.2 |
| 2004/0239955 A1* | 12/2004 | Uchida et al. ................... 358/1.1 |
| 2005/0104897 A1 | 5/2005 | Walker, Jr. |
| 2008/0109729 A1* | 5/2008 | Notea et al. .................... 715/722 |
| 2009/0077465 A1* | 3/2009 | Walker, Jr. ...................... 715/274 |
| 2009/0201316 A1* | 8/2009 | Bhatt et al. ..................... 345/660 |
| 2010/0017752 A1* | 1/2010 | Plow et al. ..................... 715/804 |
| 2011/0063322 A1* | 3/2011 | Takabayashi et al. ......... 345/619 |
| 2012/0086726 A1* | 4/2012 | Matsumoto .................... 345/629 |

* cited by examiner

*Primary Examiner* — Chante Harrison
(74) *Attorney, Agent, or Firm* — Jessica Costa

(57) ABSTRACT

Electronic document design systems and methods allowing a user engaged in customizing an electronic product to select an image container and modify the placement, scaling, and displayed portion of an image associated with the image container. Upon user selection of an image container from the product design, an image pane is presented to the user which displays the base image associated with the selected image container and at least one active control on either or both of the image container and the image pane which allow the user to modify which portion of, and how the portion of, the base image appears in the electronic product design. The image editor tool is displayed simultaneously with the product design to allow the user to immediately see the resulting changes in the product design due to modifications, using the active control(s), of the placement or scaling of the selected image container or of the cropping of the base image or magnification of the portion of the base image appearing within the image container.

35 Claims, 23 Drawing Sheets

US 8,587,614 B2

SYSTEM AND METHOD FOR IMAGE EDITING OF ELECTRONIC PRODUCT DESIGN

FIELD OF THE INVENTION

The present invention relates to computer-implemented automated electronic product design.

BACKGROUND OF THE INVENTION

Many individuals, businesses, and organizations occasionally have a need for custom printed or electronically displayed products, such as birth announcements, party invitations, product or service brochures, promotional postcards, personalized holiday cards, or any number of other items. For printed products, some of these individuals and businesses turn to sources such as a local print shop for assistance in preparing the materials. Those having access to a suitable computer may perform the product design process themselves using any of the various specialized software products available for purchase and installation on an appropriate computer system or by using a Web-based printing service provider that takes advantage of the capabilities of the Web and modern Web browsers to provide document design services from any computer with Web access at whatever time and place is convenient to the user. For either or both printed products and electronically displayed products, web-enabled service providers, or at least those service providers having computer systems available for customer use, typically provide their customers with the ability to access and view pre-designed product templates and to enter information to create a customized product design. As used herein the term "product template" or "product design template" is an electronically displayed editable WYSIWYG product design having a pre-designed format. As used herein, the term "WYSIWYG" stands for "What You See Is What You Get" in which the product design template is displayed on the user's computer screen in a form indicating how the product will appear when printed. Thus, while the product design template is edited by the user, the product design template is being updated and displayed on the user's computer screen such that the product design template appears as the product design will appear if printed or otherwise electronically displayed. A product design template is typically used as a starting point for user personalization so that the format does not have to be created by the user or recreated each time it is used.

The use of pre-designed electronic product templates imposes limitations and constraints on the flexibility of the product design system and its usefulness to many customers. Traditionally, the template provider has individually designed each template by defining various components of the template, such as the size and position of all image and text areas in the template; the selection, cropping and positioning of all images; the color schemes and selection of colors to be used for template components having a color attribute, and so forth. The template designer adjusts the various components until the designer is satisfied with the overall appearance of the template.

Once a product design template is complete, it may be published by the service provider and made available to customers for selection and editing to allow the user to personalize the template design with customer-specific information. Because the product design template has been pre-designed, it allows a customer to quickly add text and upload images (or select one or more images from a number of possible choices that have been pre-selected by the template designer or service provider) to quickly generate a user-customized product design. However, user editing of the template is typically limited to allowing the user to add, modify and position text and perhaps upload images to be added to the product design.

Not only is this prior art individual template design method time consuming and a significant expense for the template provider, in several ways it limits the service provider's ability to fully satisfy the desires and requirements of its customers. For example, a product design template provider may have many electronic images that it would like to make available for use by its customers, but the template provider may only have the resources to produce a limited number of template variations, leaving many images unused and unavailable to customers. In addition, the size and shape of various products offered by the template provider requires that the template provider make image cropping decisions regarding the portion of an image that will be incorporated into a particular product design. Some customers may wish to modify the crop settings of an image. While Crop tools do exist which allow the user to modify the cropping boundaries of an image, when activated these Crop tools are typically opened in an entirely separate window or page without the ability to view the effects of the cropping in the product design without first exiting the tool or closing the window. Other tools may display the product design but do not update the changes to the image portion displayed in the product design until the Crop tool is exited. However, no tools currently exist which allow the customer to simultaneously view both the base image with a cropping indicator thereon (indicating the portion of the image appearing in the product design template) and the product design template displaying the portion of the image therein as selected by cropping indicator to allow the customer to modify aspects of the cropping window or image container and immediately see the effects of the modifications in both the cropping window and the product design. Furthermore, while some potential customers may like the image content of a particular product design template, they may wish to have more template editing capability to manipulate the size, placement, magnification, and portion of the various images in the design while simultaneously being able to view the result of such changes in the product design template.

There is therefore a need for a flexible electronic product editing and customization system that allows a user to select an image container of an electronic product design template and to readily and easily modify the placement, scaling, and displayed portion of an image associated with the image container, in a manner that allows the user to simultaneously view both the portion of the image selected for display relative to the base image associated with the image container and the resulting image content of the selected portion of the base image as it will appear in the product design as shown in the product design template.

SUMMARY

The present invention is directed to satisfying the need for computer implemented systems and methods that provide flexible electronic product design image editing tools.

In an embodiment, a computer-implemented method is provided for facilitating user customization of the image content of an image container in an electronic product design. The method includes displaying an electronic design to a user, the design comprising at least one image container, the at least one image container associated with a corresponding base image and displaying a portion of the base image therein; allowing the user to select an image container from the electronic design for customization; and upon user selection of an image container from the electronic design, displaying to the user, simultaneously with the electronic design, an image pane displaying the entire base image associated with the selected image container, thereby allowing the user to simultaneously view both the base image associated with the selected image container and the portion of the base image appearing in the electronic design within the context of the electronic design.

In another embodiment, one or more computer readable media having embodied therein computer program code for facilitating user customization of the image content of an image container in an electronic design are provided, the code comprising code for displaying an electronic design to a user, the design comprising at least one image container, the at least one image container associated with a corresponding base image and displaying a portion of the base image therein; code for allowing the user to select an image container from the electronic design for customization; code for receiving a user selection of an image container from the electronic design; and code for displaying to the user, simultaneously with the electronic design, an image pane displaying the entire base image associated with the selected image container, thereby allowing the user to simultaneously view both the base image associated with the selected image container and the portion of the base image appearing in the electronic design within the context of the electronic design.

In yet another embodiment, a system is provided for facilitating user customization of the image content of an image container in an electronic design, the system comprising one or more processors; and one or more computer readable media having embodied therein computer code which, when executed by the one or more processors, implements a method including displaying an electronic design to a user, the design comprising at least one image container, the at least one image container associated with a corresponding base image and displaying a portion of the base image therein; allowing the user to select an image container from the electronic design for customization; and upon user selection of an image container from the electronic design, displaying to the user, simultaneously with the electronic design, an image pane displaying the entire base image associated with the selected image container, thereby allowing the user to simultaneously view both the base image associated with the selected image container and the portion of the base image appearing in the electronic design within the context of the electronic design.

In yet another embodiment, a computer-implemented method for facilitating user customization of the image content of an image container in an electronic design, the method comprising downloading computer program code for facilitating user customization of the image content of an image container in an electronic design to a user computer for execution on the user computer, the code comprising code for displaying an electronic design to a user, the design comprising at least one image container, the at least one image container associated with a corresponding base image and displaying a portion of the base image therein; code for allowing the user to select an image container from the electronic design for customization; code for receiving a user selection of an image container from the electronic design; and code for displaying to the user, simultaneously with the electronic design, an image pane displaying the entire base image associated with the selected image container, thereby allowing the user to simultaneously view both the base image associated with the selected image container and the portion of the base image appearing in the electronic design within the context of the electronic design.

In yet another embodiment, a system is provided for facilitating user customization of the image content of an image container in an electronic design, the system comprising one or more processors; and one or more computer readable media having embodied therein computer code which, when executed by the one or more processors, a method including downloading computer program code for facilitating user customization of the image content of an image container in an electronic design to a user computer for execution on the user computer, the code comprising code for displaying an electronic design to a user, the design comprising at least one image container, the at least one image container associated with a corresponding base image and displaying a portion of the base image therein; code for allowing the user to select an image container from the electronic design for customization; code for receiving a user selection of an image container from the electronic design; and code for displaying to the user, simultaneously with the electronic design, an image pane displaying the entire base image associated with the selected image container, thereby allowing the user to simultaneously view both the base image associated with the selected image container and the portion of the base image appearing in the electronic design within the context of the electronic design.

DETAILED DESCRIPTION

Figure 1:
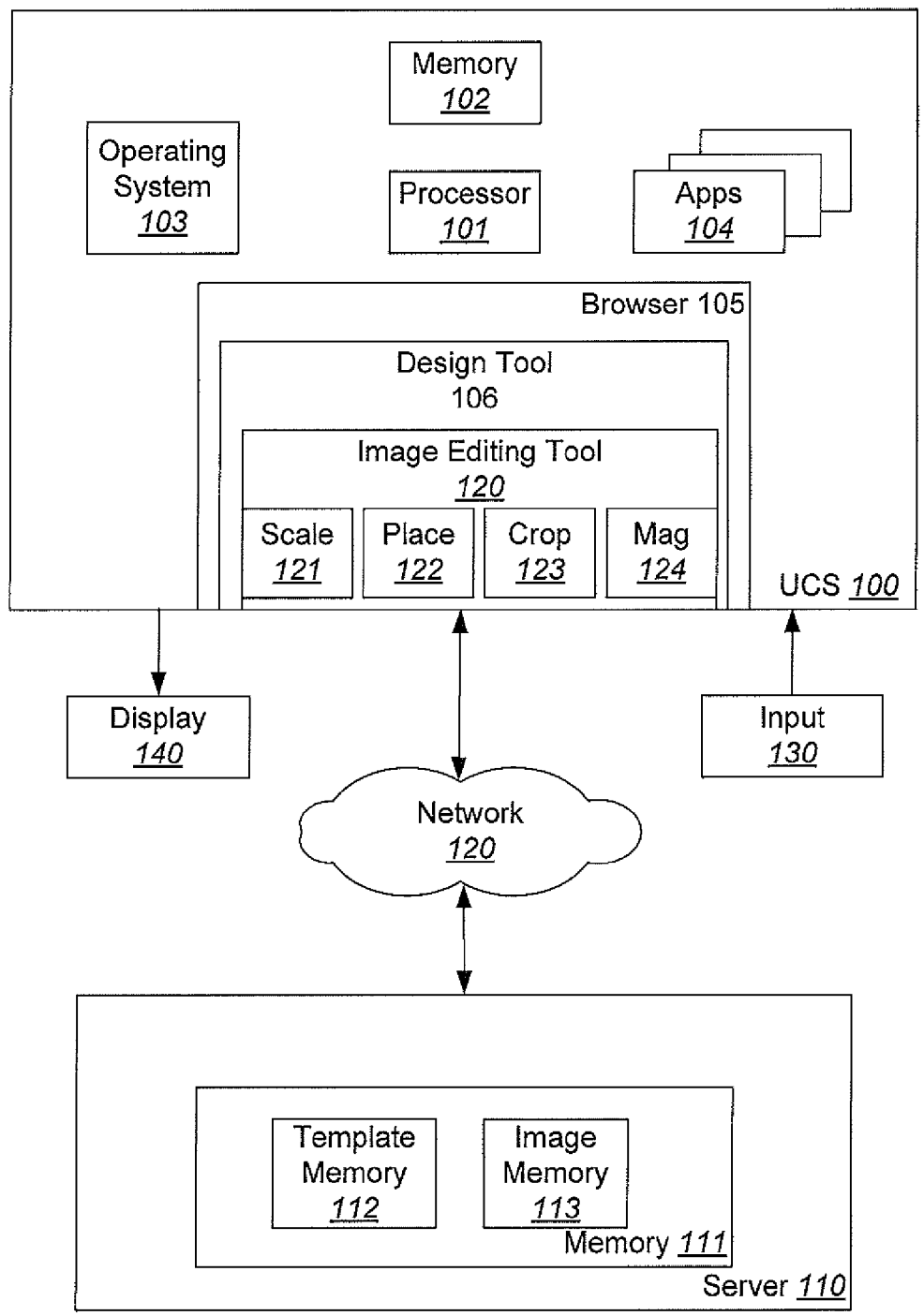
FIG. 1 is a block diagram of a computer system with which the invention may be employed.

Referring to FIG. 1, an exemplary user computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 may also be a portable computer, a tablet computer or other device. The user views images from UCS 100 on display 140, such as a CRT or LCD screen, and provides inputs to UCS 100 via input devices 150, such as a keyboard and a mouse.

When UCS 100 is operating, an instance of the USC 100 operating system will be running, represented in FIG. 1 by operating system 103. In addition, the user may be running one or more application programs. In FIG. 1, UCS 100 is running Web browser 105, such as Internet Explorer from Microsoft Corporation. Other applications that may be running in USC 100, such as spreadsheet, e-mail, and presentation programs, are represented as applications 104. In the depicted embodiment, design tools 106 include one or more product design programs downloaded to UCS 100 via network 120 from remote server 110, such as downloadable design tools provided by VistaPrint Limited and publicly available at vistaprint.com. Design tools 106 run in browser 105 and allow the user to prepare a customized product design in electronic form. Alternatively, design tools 106 may have been obtained by the user from memory 102 or from another local source. Design tools 106 include an image editor tool 120, which provides the user with tools for scaling 121, placing 122, cropping 123, and magnifying 124 images in an electronic product design. When the customer is satisfied with the design of the product, the design can be uploaded to server 110 for storage and, if desired by the user, subsequent production of the desired quantity of the physical product on appropriate printing and post-print processing systems. While server 110 is shown in FIG. 1 as a single block, it will be understood that server 110 may be multiple servers configured to communicate and operate cooperatively.

Memory 111 represents all components and subsystems that provide server data storage, such as RAM, ROM, and disk drives or arrays. Template memory 112 contains the various layout, design, color, font, and other information provided by the service provider to enable the creation and rendering of product design templates. As used in this embodiment, a template is an XML description of a product design that specifies the initial size, position and other attributes of all product design elements such as text containers, image containers, graphics, z-index values and so forth. The site operator may allow the user to modify one or more of the template elements.

Image memory 113 represents the portion of memory 111 that contains the images and any related image attributes used by the service provider to generate the product design, such as the image size, default colors associated with the image, and one or more keywords that have been associated with that image by the printing service provider. Image memory 113 includes a base image and may, but need not, include one or more cropped versions of the base image prepared by the service provider to fit various image container shapes. A wide variety of different templates can be created by combinations of layouts and images. U.S. Pat. No. 7,133,050, assigned to the assignee of interest in the present application and entitled "Automated Image Resizing and Cropping", the complete contents of which are hereby incorporated by reference into this application, discloses document editing systems for combining separately stored images and layouts to create document designs.

Figure 2:
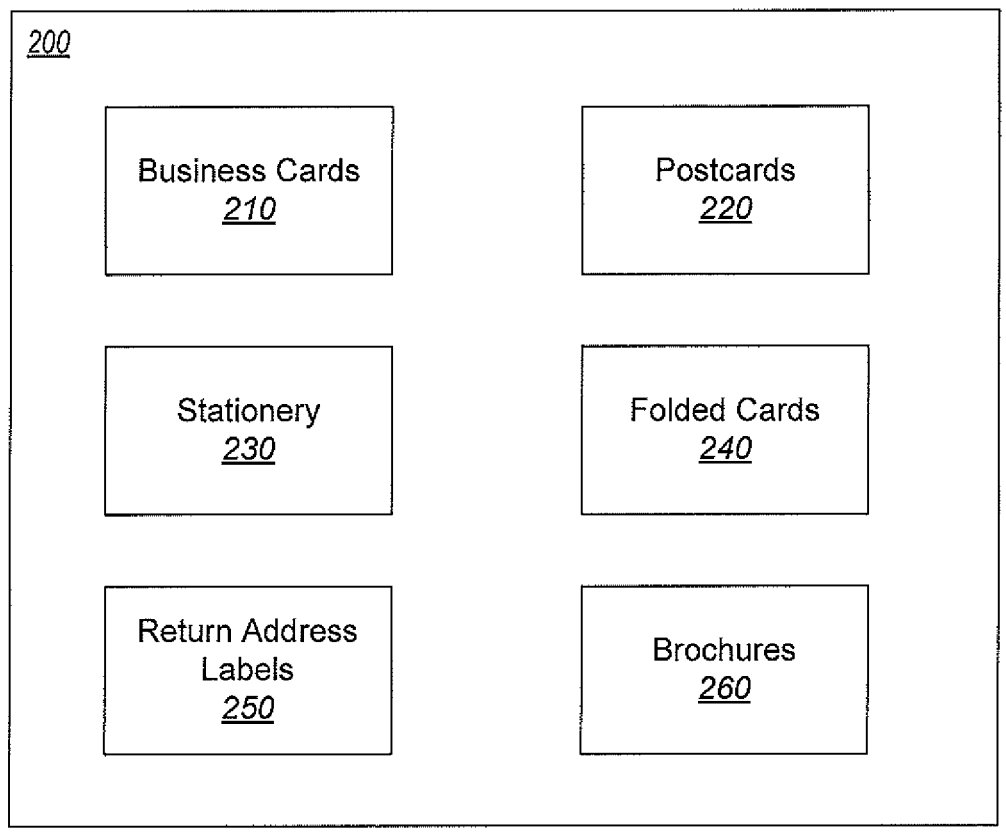
FIGS. 2-16 are schematic representations of displays presented to a user engaged in designing an electronic document.

FIG. 2 is a simplified representation of an introductory product selection page 200 being viewed by the user of UCS 100 on user display 140. In this example the page displays and promotes various products available from the service provider and offers active controls that allow the user of UCS 100 to select a desired type of product for a more detailed presentation of design options. By way of example, FIG. 2 shows promotional images for business cards 210, postcards 220, stationery 230, folded cards 240, return address labels 250, and brochures 260. Images or promotions for fewer, different or additional products, such as presentation folders, invitations, announcements, thank you cards, gift tags, and so forth may also be presented along with other information and links. It will be understood that the invention is not limited to documents that are intended for eventual printing. The invention is also applicable to the design of documents intended for use in electronic form, such as electronic business cards, online brochures, and templates for presentation graphics software programs. The invention may as well be readily adapted to a wide range of products that a user may wish to customize, such as items of clothing, product containers, promotional goods, and so forth. It will also be understood that while the invention is described in the context of an embodiment of an electronic product design template, the image editing tool may be applied in the context of any type of electronic graphic design, for example electronic publishing tools, website design tools, etc.

As an illustrative example, it will be assumed that the user of UCS 100 desires to create a personalized postcard and, therefore, selects the postcard option, for example by clicking with the user's mouse cursor on the postcard 220 image. The user will then be presented with one or more additional selection screens, not shown, from which the user can review the various postcard categories by general theme or subject matter and then, when the desired category is selected, review one or more pages of thumbnail images of postcard templates prepared by the service provider. When a desired template thumbnail is located, the user can click on the thumbnail image to cause server 110 to download the selected product design template information and initiate a custom product design session. As an alternative to providing a large gallery of thumbnail template images for the user to scan, the service provider may provide a keyword searching tool to allow the service provider to display only thumbnails of templates with images or other content corresponding to the user's search terms.

Figure 3:
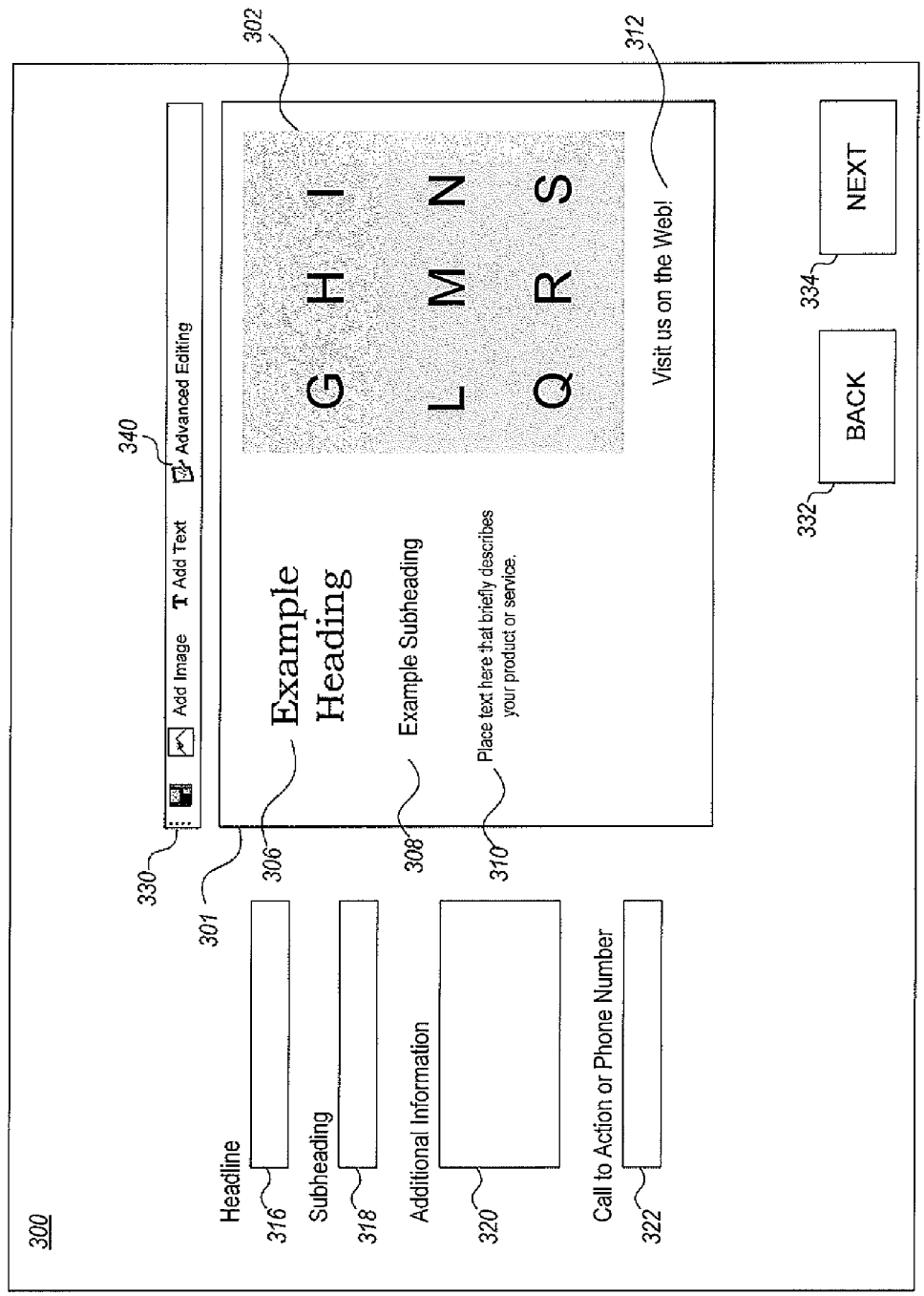

Referring to FIG. 3, when the user selects a thumbnail image of a specific product design template that the user desires to customize, the user is presented with a customization window 300 which displays a larger customizable product design template 301 of the selected product design. The selected product design template 301 may contain a wide variety and number of images, colors, graphics and other design components. For simplicity of discussion, in the example shown in FIG. 3, product design template 301 represents one side of a postcard being designed by a user.

The selected product design template 301 may include text containers 306, 308, 310, 312 which display text personalized by the user. Tools are provided to allow the user to customize the content of the text containers 306, 308, 310, 312. In an embodiment, the customization window 300 includes text prompts which prompt the user for personalized information for each of the text containers. In the example template of FIG. 3, the user is prompted for content related to "Headline" 316, "Subheading" 318, "Additional Information" 320, and "Call to Action or Phone Number" 322. When the user enters text for each prompt, the text is automatically displayed in the corresponding text containers 306, 308, 310, 312 in the product design template 301, providing the user with immediate feedback as to how the final product design will appear.

For ease of discussion, the product design template 301 is shown as having a single image container 302. It will be understood that template 301 could have multiple image containers. As defined herein, an image container is an area in an electronic design that indicates the display boundaries of image content. When a base image associated with the image container 302 is uncropped, the image container dimensions match the base image dimensions. The product design template 301 may automatically associate an image with the image container 302, for example as pre-associated by the template designer or as the result of a user keyword search, and/or may provide tools to allow the user to associate a user-provided image, or to allow the user to change the image associated with the container to any one of a number of different alternative images.

As mentioned above, the product design template 301 displayed to the user is the result of the combination of various separately stored template component elements including the text containers 306, 308, 310, 312, the image container 302, and the layout describing the size and position of the containers. The initial product design template 301 is the starting point for the user's customized product design. The user can not only add the user's personalized text and additional images, but can also, as discussed below, modify the scaling, placement, sizing, magnification, and cropping of images in the product design template.

To allow the user to customize the product design template 301, the user is provided with template editing tools. Edit Tool Bar 330 contains various buttons, controls and menus allowing the user to add additional text boxes, insert text, change the font, change font attributes, and perform other typical editing actions. The techniques for designing and using edit tool bars are well known in the art. Navigation buttons Back 332 and Next 334 allow the user to move back to the previous display screen or ahead to the next. Different or additional navigation means may also, or may alternatively, be employed.

Depending on the level of customization capabilities the service provider desires to give to the user, the service provider may also choose to provide the user with one or more additional instructions, tools, or controls (not shown) to facilitate user editing of the product design template 301, such as tools for changing the template layout, the color scheme, the design effects, or the font scheme. Co-pending and co-owned U.S. application Ser. No. 10/449,836 entitled "Electronic Document Modification", filed May 20, 2003, the complete contents of which are hereby incorporated by reference into this application, describes a document editing system and method using separately selectable layouts, designs, color schemes and font schemes.

Design tool 106 provides one or more methods to allow the user to select an image container for editing. In an embodiment, the user may select an image container by single-clicking on the desired image in the product design template, but it will of course be understood that any of many other well-known techniques for image container selection may be used.

Figure 4:
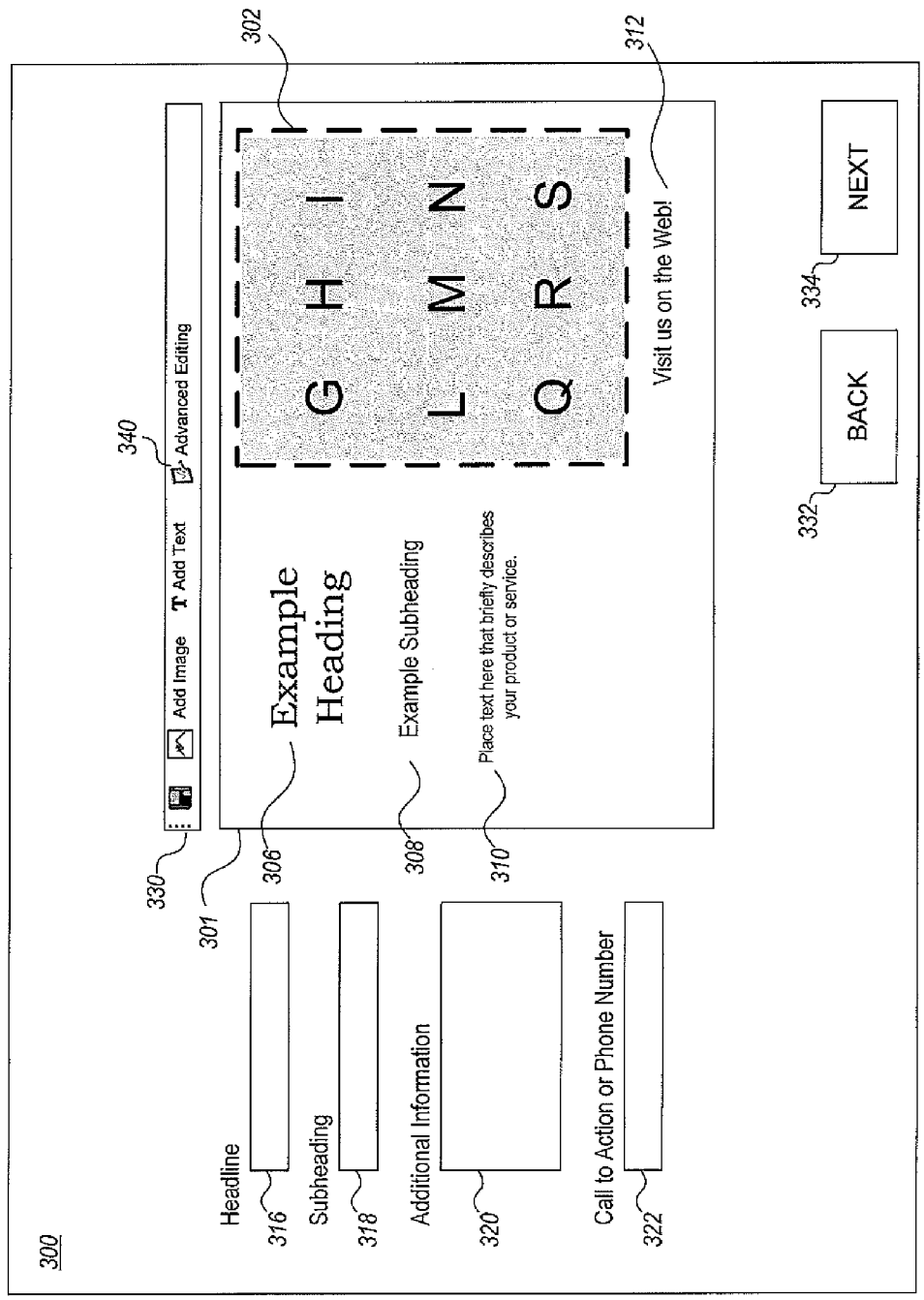

FIG. 4 illustrates the product design template 301 upon selection of image container 302, wherein selection of the image container is indicated by the dashed line bordering the perimeter of the image container 302. It will be understood that many other methods may be implemented for allowing the user to indicate selection of an image container, for example, by highlighting or otherwise providing a visual distinction between the selected image container 302 and the remaining non-selected components of the product design template 301.

Design tool 106 provides one or more methods to allow the user to indicate a desire to modify an image in the product design template 301. For example, as illustrated in the pop-up instructions 341 in FIG. 5 which are displayed when the cursor 303 is positioned over the image container 302, the design tools 106 may require the user to position the cursor 303 over the desired image container, right-click to display a pull-down action list, and click on an edit option. In another example, as illustrated in FIG. 6, the design tools may require the user to click on a link such as an Advanced Editing button 340. It will be understood that many other methods may be implemented for allowing the user to indicate a desire to modify an image container, for example, by positioning the user's mouse cursor over the desired image container and double clicking the image, or by displaying an editing tool automatically upon selection of an image container.

Figure 5:
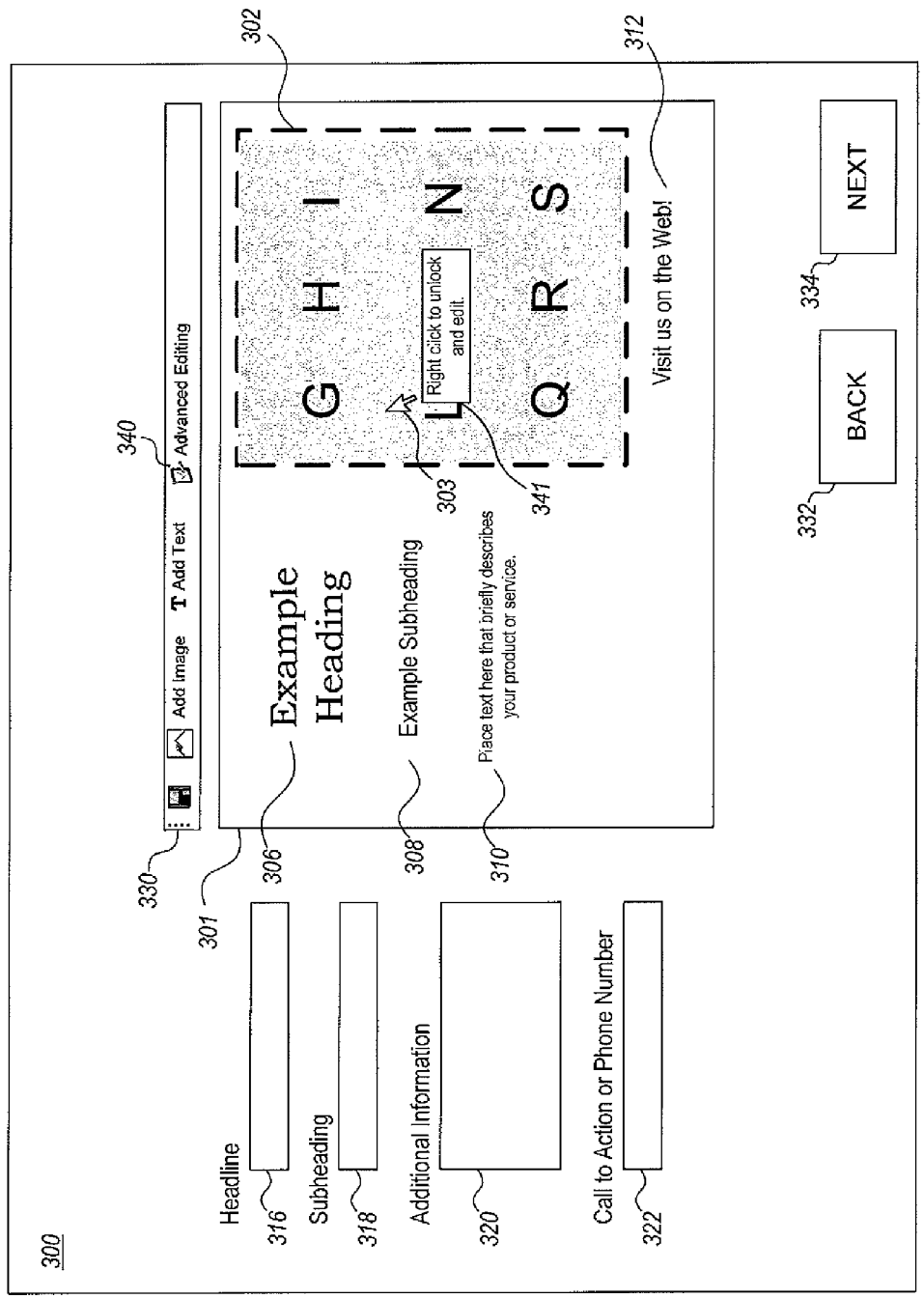
Figure 6:
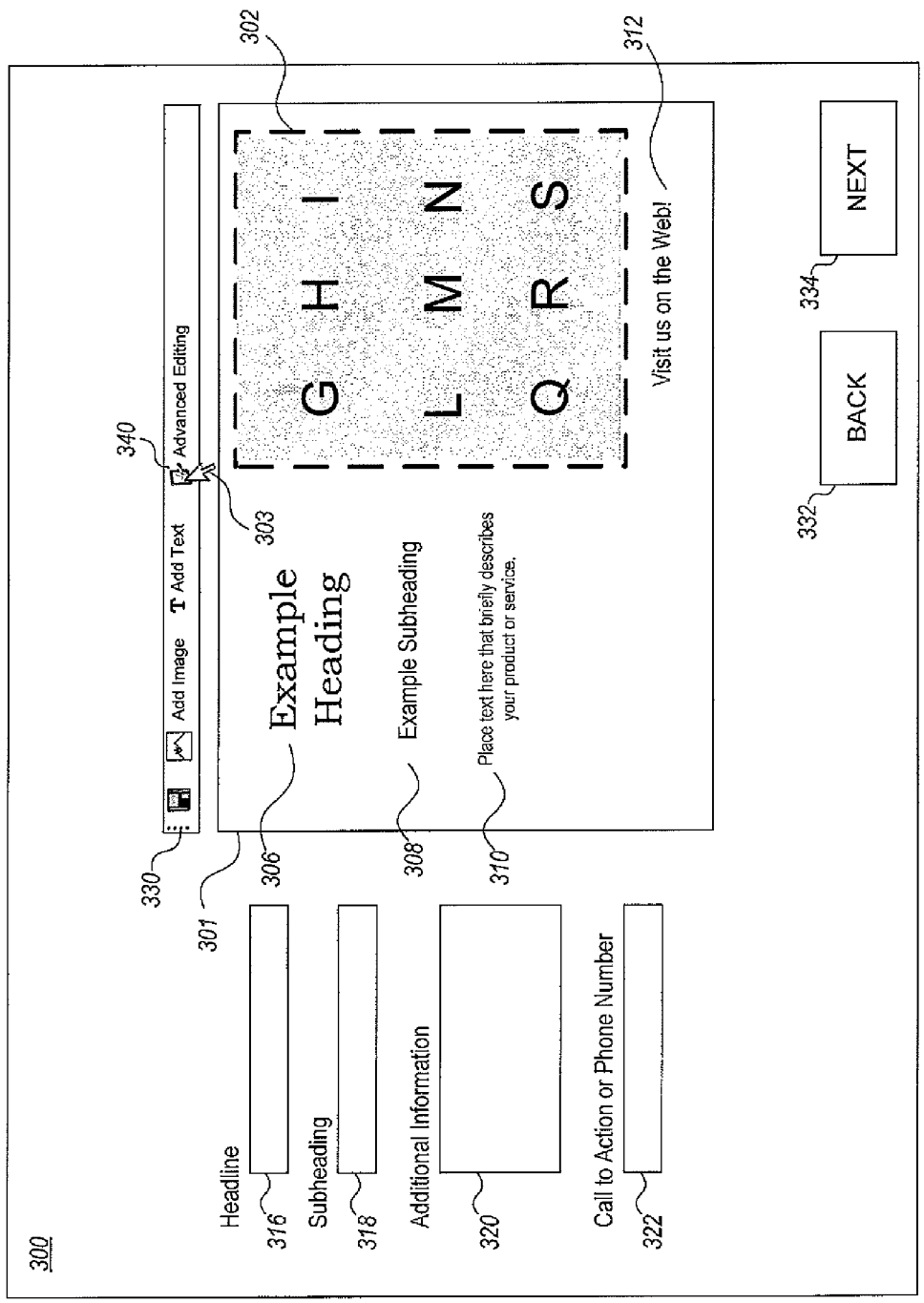
Figure 7:
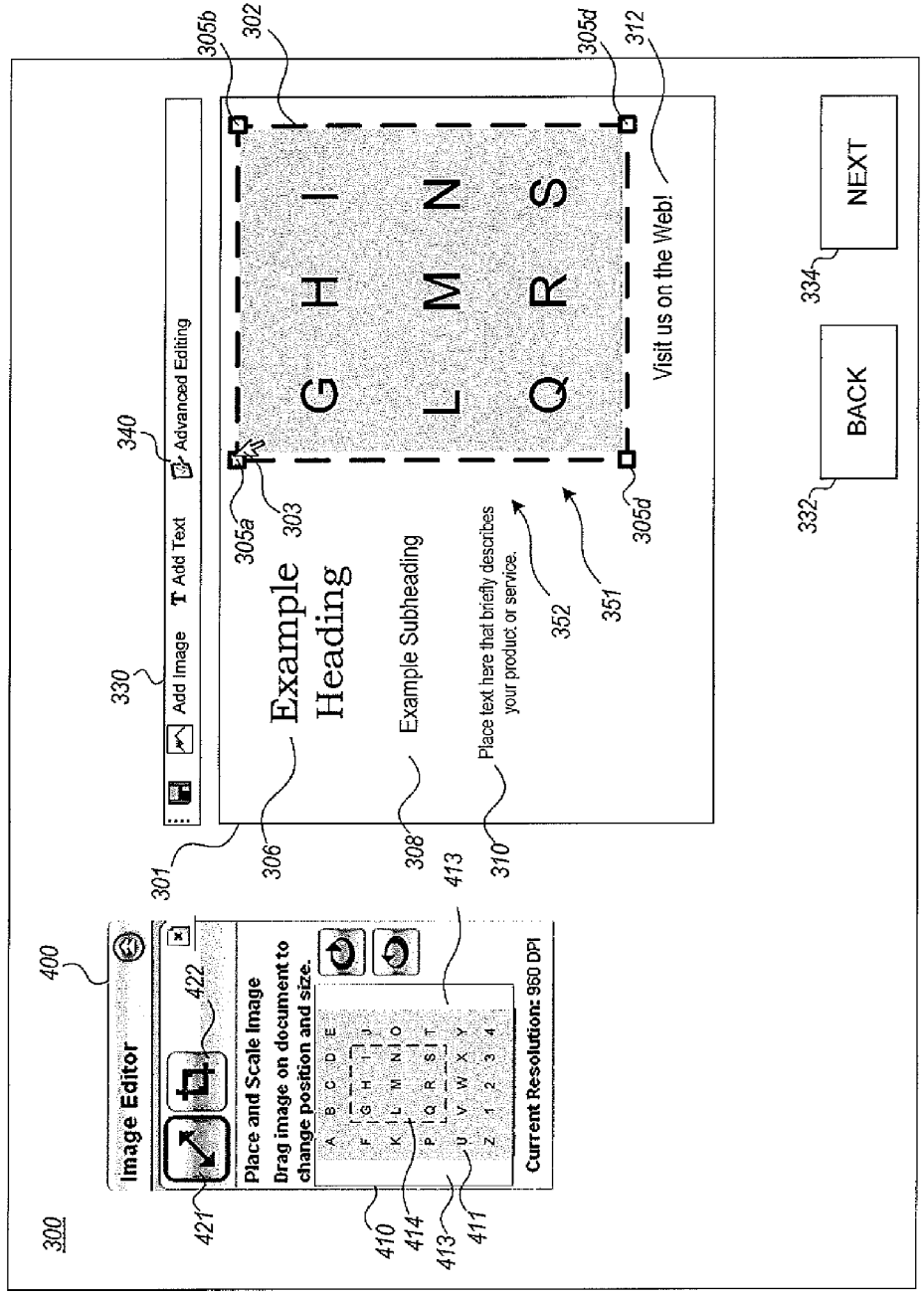

Referring to FIG. 7, in response to the user's action of indicating a desire to modify a selected image container, for example using one of the methods illustrated in FIG. 5 or 6, a panel referred to herein as an image editor tool 400 is presented to the user simultaneously with the product design template 301 in the customization window 300. Image editor tool 400 includes an image pane 410 which displays a thumbnail image of the base image 411 that is currently associated with the selected image container 302. If the base image 411 has the same aspect ratio as image pane 410, it will completely fill the image pane 410 when displayed. More likely, however, the base image 411 will not have the same aspect ratio as the image pane 410 and therefore, in order to display the thumbnail, the thumbnail image of the base image 411 will be scaled to fit (i.e., maintaining the aspect ratio of the base image) within the image pane 410. Portions 413 of the image pane 410 not filled with the thumbnail image of the base image 411 are filled with transparent overlays.

During the design of the product design template 301, the template designer may have previously cropped the base image 411 to select only a portion of the image 411 to be displayed in the image container 302. For example, in the embodiment shown, the base image 411 has been previously cropped by the template designer to the portion of the base image within the dashed lines indicated at 414 so that only the cropped portion of the base image 411 appears in the product design template 301.

When an image is not previously cropped upon activation of the image editor tool 400, the dimensions of the base image 411 are proportional to the dimensions of the selected image container 302, and the image content of the image container 302 corresponds to the full base image 411.

The image editor tool 400 offers the user the editing choices of modifying the current placement of the selected image container 302, modifying the current scale (i.e., size) of the selected image container 302, modifying the portion of the base image 411 displayed in the selected image container 302, and modifying the magnification of the image content displayed in the selected image container 302. While it will be appreciated that there are many ways to implement the activation of these various editing choices (i.e., indicating the user's desire to perform one of these operations), in the illustrative embodiment, the image editor tool 400 has two modes: a Place and Scale mode in which the user may utilize a Place tool 351 and a Scale tool 352, as will be discussed below in connection with FIGS. 10-16, and a Crop and Magnify mode in which the user may utilized a Crop tool 353 and a Magnify tool 354, as will also be discussed below in connection with FIGS. 10-16. In the illustrative embodiment, the Place and Scale mode is activated by selecting a link in the image editor tool 400 in the form of a button 421. The Crop and Magnify mode is activated by selecting a link in the image editor tool 400 in the form of a button 422. Each of these modes will be discussed in more detail below. The user may also, if desired, choose to cancel the image editor tool 400 by deselecting the image container 302, for example by clicking elsewhere in the product design image.

Upon initial activation of the image editor tool 400, in one embodiment (shown in FIG. 7), the Place and Scale mode is automatically active, i.e., available to the user. Of course, in other embodiments, the Crop and Magnify mode may be initially automatically active, or other combinations, or only one, of the tools (Place, Scale, Crop, Magnify) may be automatically active. Alternatively, other embodiments may dictate that none of the tools are automatically active until the user actively selects a particular operation.

Turning now to the discussion of the Scale tool 352 in FIG. 7, the Scale tool 352 is an active control provided and displayed as drag handles 305 (shown as 305a, 305b, 305c, 305d) on the selected image container 302 in the product design template 301. In the illustrative embodiment, the drag handles 305, indicated by small square boxes, are located on the corners of the selected image container 302. If a user clicks on one of the drag handles 305 and moves the mouse to drag the cursor 303, the image container 302 changes size while maintaining the aspect ratio of the original container. As is well known, the aspect ratio of an image is the ratio of the image's width to the image's height. The aspect ratio of the image container is the ratio of the container's width to height. Thus, if the mouse is moved to drag the cursor 303 in a direction towards the interior of the image container 302, the image container 302 becomes proportionally smaller wherein the dimensions of the image container 302 maintain the same aspect ratio as the dimensions of the originally sized image container 302 (i.e., the ratio of the height to width of the image container 302 is constant even as the actual dimensions of the image container 302 are changed). Conversely, if the mouse is moved to drag the cursor 303 in a direction away from the interior of the image container 302, the image container 302 becomes proportionally larger wherein the dimensions of the image container 302 maintain the same aspect ratio as the dimensions of the originally sized image container 302.

Importantly, the image content of the image container 302 maintains the same aspect ratio as the image content of the originally sized image container 302 as well. Thus, if the image container 302 becomes larger, the displayed image container 302 is the same content as the original image container 302 but is scaled proportionally larger such that it fills the larger image container 302. It will be noted that because the base image comprises only a fixed number of pixels, when the image container is scaled to a larger size in the Place and Scale mode, the resolution of the displayed image content will decrease. The opposite is true when the image container 302 is scaled to a smaller size, although the resolution of the displayed image content has an upper bound limited to the resolution of the user's display screen and associated graphic settings of the user's monitor. When a product design template is printed, however, the resolution has an upper bound of the resolution of the base image.

Figure 8:
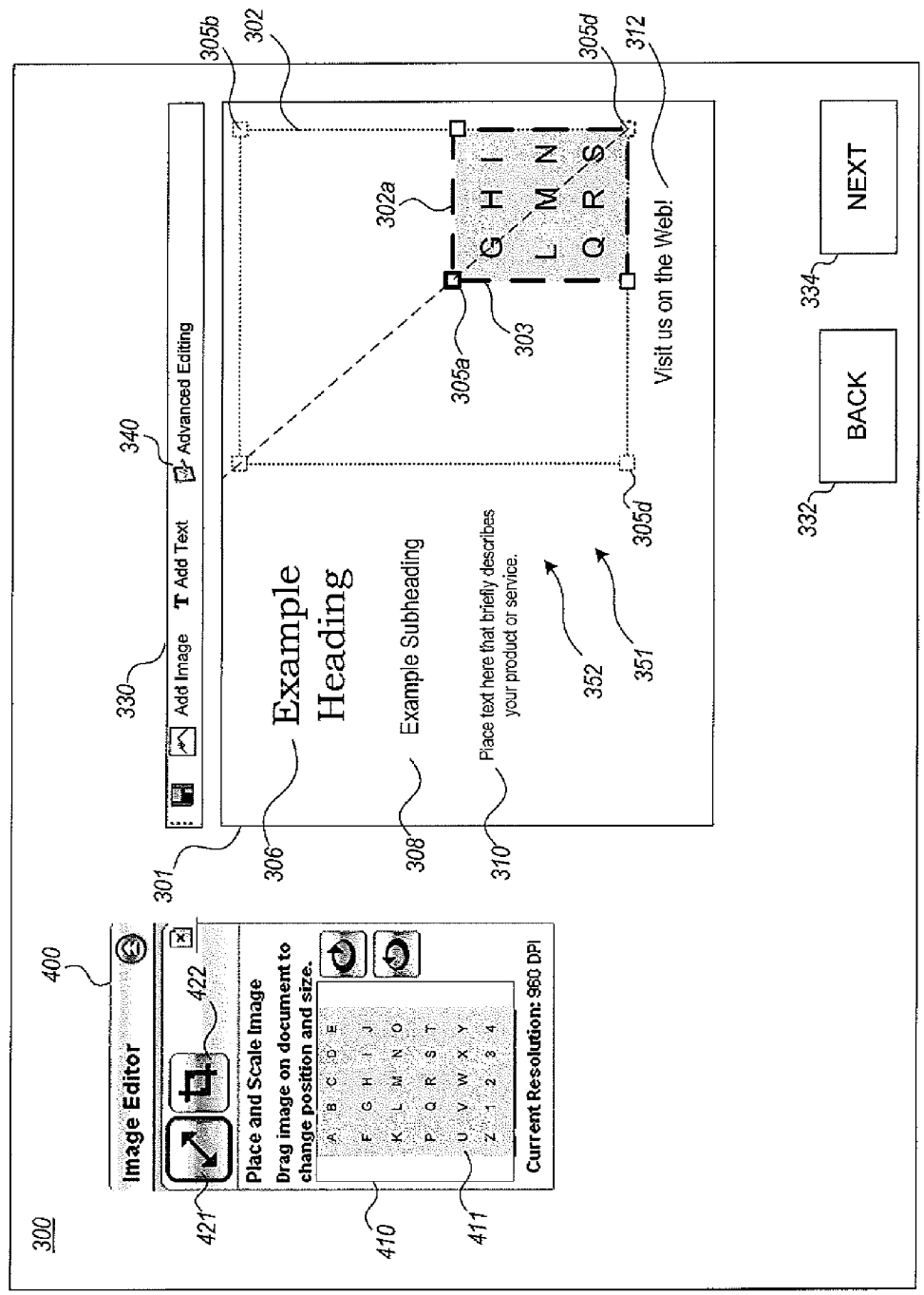

Referring now to FIG. 8, in this example the user has clicked on drag handle 305a and has moved the mouse to drag the cursor 303 in a direction toward the interior of the image container 302. Upon release of the mouse click, the size of the image container 302 is fixed to that indicated by 302a. Thus, the image container 302 and associated image content has been resealed to a smaller proportional size, as indicated by 302a. Note that the aspect ratio of both the container dimensions and the image content is maintained. Thus, the ratio of height to width of image container 302 is the same as the ratio of height to width for modified image container 302a. Note also that while the drag handles 305 are implemented and displayed in the illustrative embodiment on the corners of the image container 302, in alternative embodiments they may be alternatively or additionally implemented and displayed along any point of the perimeter of the image container 302. For example, while not shown, drag handles may be implemented and displayed on the midpoints of each image container boundary section between every set of two adjacent corners. Thus, if a user drags on a handle 305 that is connected to only one boundary (e.g., only one of a horizontal or vertical boundary of image container 302), the Scale tool 352 automatically adjusts the adjacent boundaries (e.g., the vertical boundaries if the selected handle is connected to a horizontal boundary, and the horizontal boundaries if the selected handle is connected to a vertical boundary) to maintain a constant aspect ratio.

It will be appreciated that in scaling an image container 302 and its associated image content, one point of the image container 302 must be fixed, or "anchored", from which to allow relative expansion or compression of all of the other points in the image container 302 (and associated image content). In the illustrative embodiment, the anchor point is chosen as the opposite corner of the selected drag handle 305. However, it will be appreciated that in practice, any point of the image container (either along the perimeter or within the interior) may serve as an anchor point and it is up to the image editor tool designer to select and implement the anchor protocol and/or to allow the user to choose an anchor point. For purposes of simplicity of description of the present invention, the anchor points of the image containers in the embodiments described herein are selected to be the corner of the image container 302 located opposite from the selected drag handle.

In the example shown in FIG. 8, the image container 302 is scaled to a smaller size (shown as 302a). Note that because the scaling operation does not alter the base image, the thumbnail image of the base image displayed in the image pane 410 remains unchanged after a scale operation. To scale the image container 302 to a larger size, a similar technique is performed but the handle is dragged away from the interior of the image container 302. More specifically, the user selects one of the drag handles 305a, 305b, 305c, 305d by clicking on the mouse and moves the cursor 303 in a direction away from the interior of the image container 302 until it is a desired size, and then releases the mouse click to fix the size of the image container 302 to that of the desired size. Similar scaling operations may be performed with selection of any one of the drag handles 305 accompanied by a standard drag-and-drop action.

Figure 9:
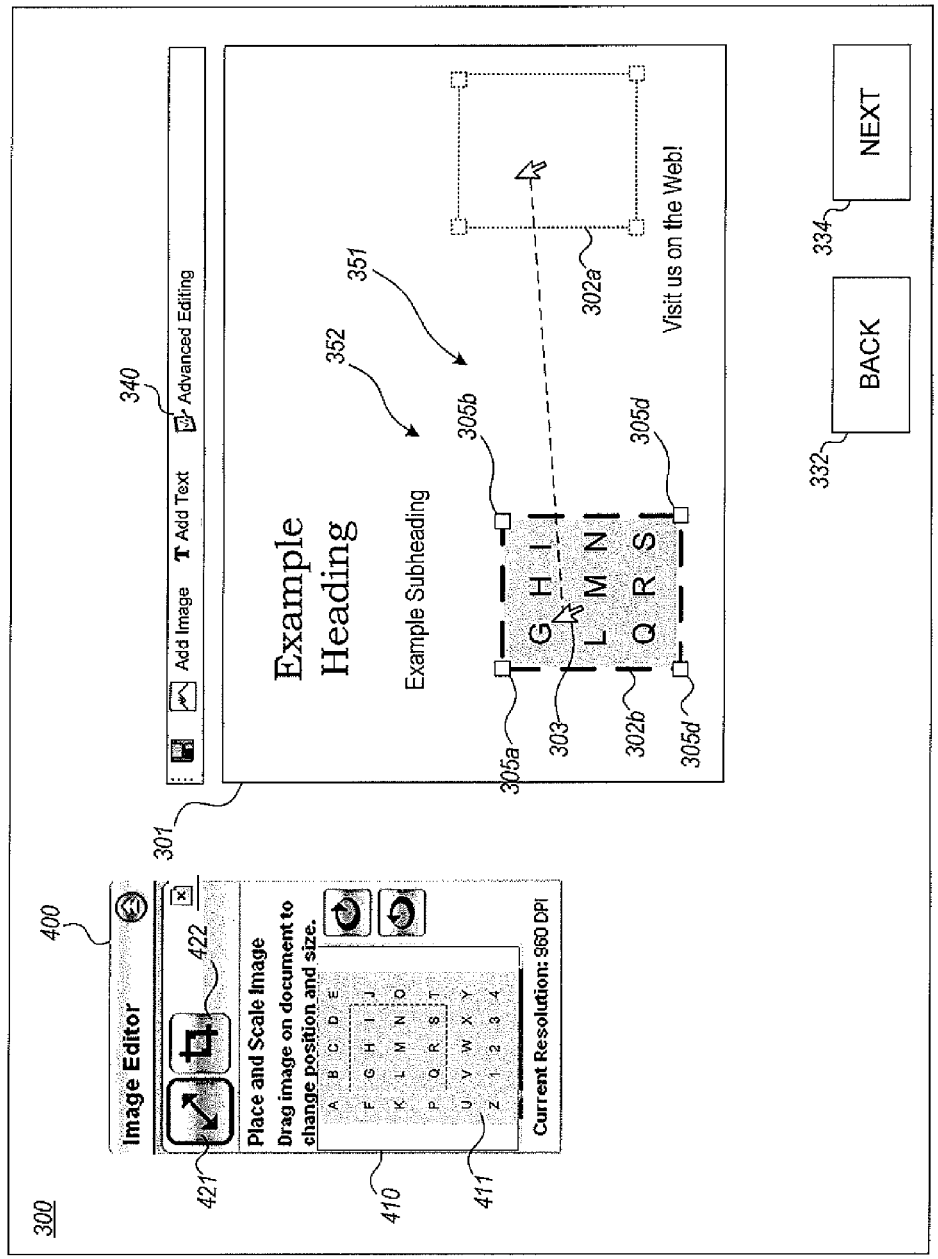

Turning now to discussion of the Place tool 351, the Place tool 351 allows the user to modify the placement of the selected image container 302 in the product design template. Referring to FIG. 9, The Place tool 351 is an active control wherein the placement of an image container 302 (shown as resealed image container 302a) may be modified by single clicking within the interior of the selected image container, moving the mouse to drag the container to a desired alternative location, and releasing the mouse click. For example, as illustrated in FIG. 9, the image container 302 has been moved from an original location, shown as 302a, to a different location, shown as 302b. Note that because the placement operation does not alter the base image, the thumbnail image of the base image displayed in the image pane 410 also remains unchanged after a placement operation.

In an embodiment, an image container 302 may be moved to any location within the boundaries of the product design template 301. In an alternative embodiment, an image container may be moved to any location within or partially outside the boundaries of the product design template 301; however, image content of any portion of an image container that is outside the boundaries of the product design template 301 will not appear in the actual product when the product design is finalized (e.g., printed or published).

Figure 10:
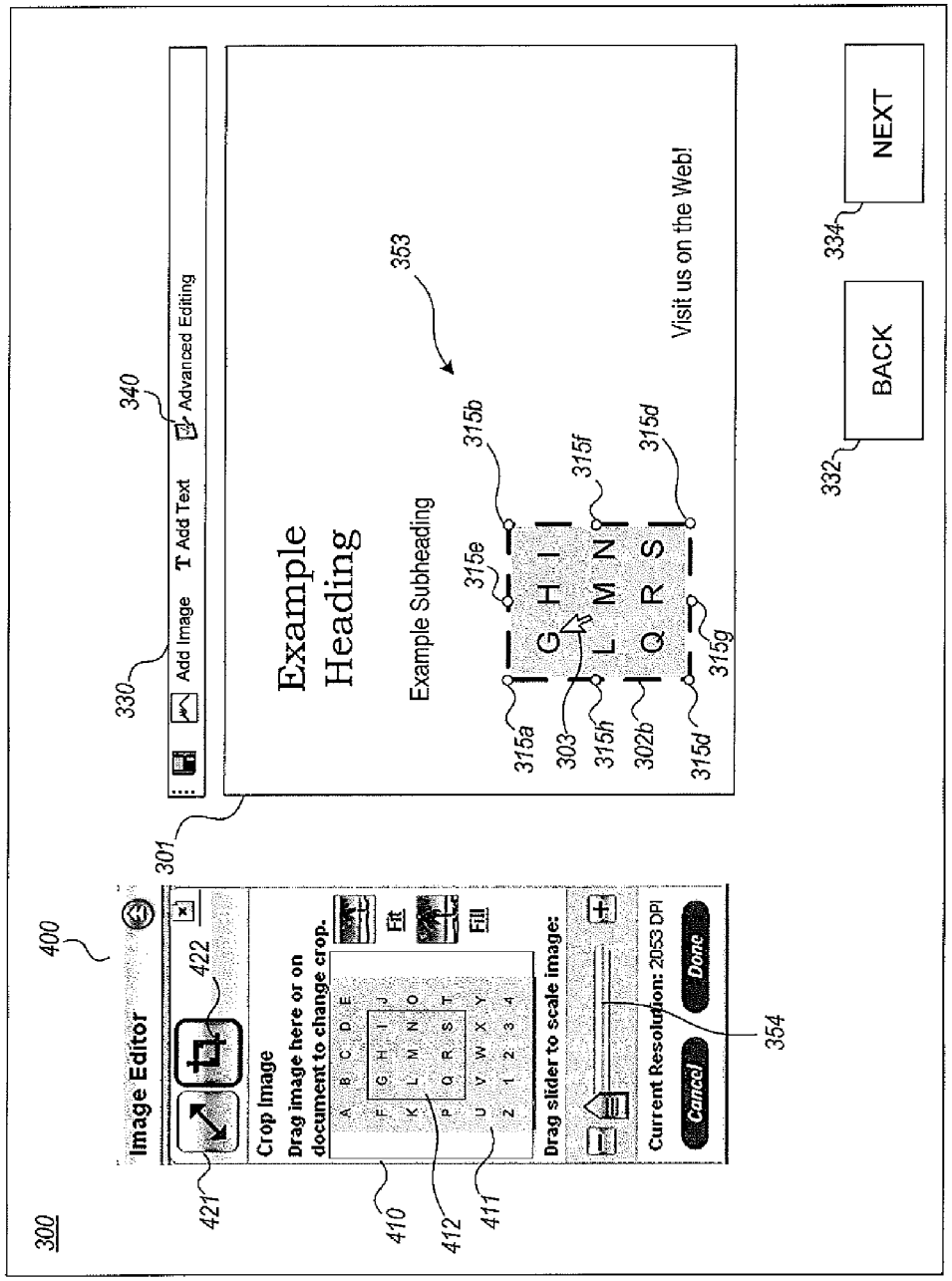

Turning now to discussion of the Crop and Magnify mode of the image editor tool 400, FIG. 10 illustrates the image editor tool 400 upon selection of the button 422. As shown, upon selection by the user of the Crop and Magnify tool button 432, the image editor tool 400 again includes the image pane 410 which displays the base image 411 currently associated with the selected image container 302 and a cropping window 412 overlaying the image pane 410. The boundaries of the cropping window 412 define the portion of the base image 411 that is displayed in the selected image container 302 in the product design template 301. As discussed previously, the designer of the product design template 301 may have pre-cropped the base image 411, in which case the cropping window 412 will circumscribe only a portion of the base image, as illustrated in FIG. 10. Alternatively, the entire base image may be used in the template, in which case the cropping window 412 will circumscribe the entire base image. The image editor tool 400 also includes a Magnify tool 354, discussed in more detail hereafter, which allows the user to modify the magnification level of the image content in the selected image container 302.

Turning the discussion now to the Crop tool 3533 the Crop tool 353 includes active controls which allows the user to reshape the dimensions of the cropping window 412 in either the image pane 410 or the product design template 301. The effects on the size of the image container 302 in the product design template 301 due to changes made to the cropping window 412 using the Crop tool's active control in the image pane 410 are automatically visible to the user. Conversely, the effects on the size of the cropping window 412 in the image pane 410 due to changes made to the image container 302 in the product design template 301 using the Crop tool's active control are automatically visible to the user.

In an embodiment, the Crop tool's active control in the product design template 301 comprises drag handles 315, shown as 315a, 315b, 315c, 315d, 315e, 315f, 315g, 315h connected to each of the boundaries of the image container 302. In the illustrative embodiment, drag handles 305, indicated by small circles, are positioned on the corners and midpoints of the boundary sections of the image container 302. It will be appreciated that the number and positions of the drag handles 315 may differ from the number and positions illustrated.

The Crop tool drag handles 315 allow a user to modify the shape and size of the image container 302 and to thereby automatically change the corresponding shape and size of the cropping window 412 displayed in the image pane. The drag handles 315 are provided to allow the user to drag-and-drop the boundaries of the selected image container 302 displayed in the product design template 301 (resulting in corresponding modification of the shape and size of the cropping window 412 displayed in the image pane 410). Drag handles connected to only one boundary section (for example, drag handles 315e, 315f, 315g, 315h connected to the midpoints of the selected image container 302) can only be used to drag-and-drop the boundary to which they are connected. Drag handles connected to two different boundary sections (for example, drag handles 315a, 315b, 315c, 315d connected to the corners of the selected image container 302) simultaneously drag-and-drop both connected boundaries.

In the Crop tool 353, when a boundary section is moved to modify the size and shape of an image container 302, the image content displayed in the image container 302 is correspondingly updated to display the portion of the base image 411 that is bounded by the newly sized and shaped cropping window 412 as shown in the image pane 410. In an embodiment, while not shown, the base image 411 may be displayed in shaded versions of the image tones used to render the portion 413 of the base image 411 circumscribed by the cropping window 412 in order to provide a more visually distinct indication of which portion 413 of the base image 411 corresponds to the image content displayed in the selected image container 302 of the product design template 301. Importantly, changes to the size and shape of the cropping window 412 using the Crop tool do not result in any changes to the image content of the image container 302 in terms of either scaling or magnification.

Figure 11A:
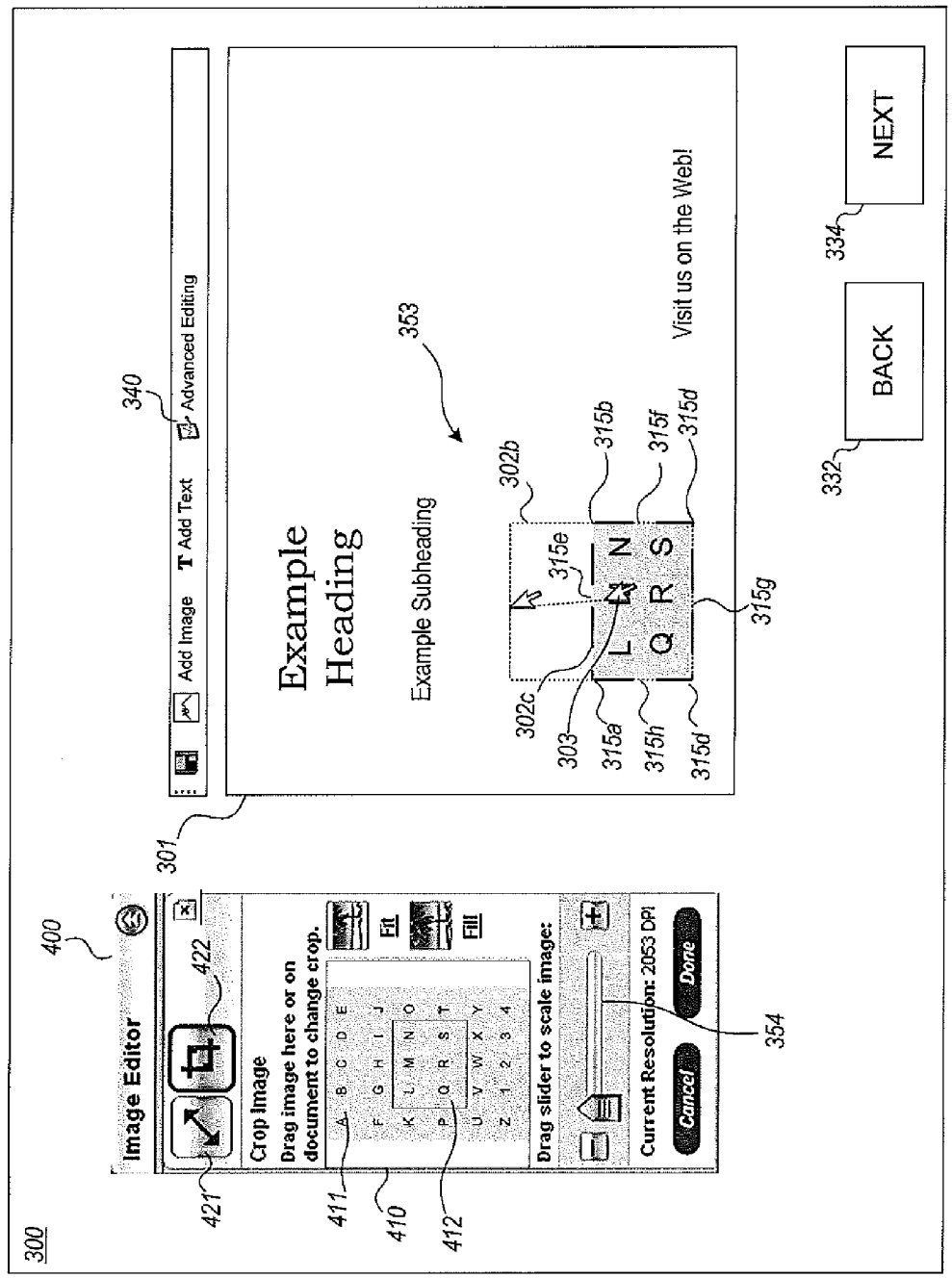

Turning now to an example application of the Crop tool, FIG. 11A shows the product design screen after the user has selected the drag handle 315e positioned at the midpoint of the top horizontal boundary section of the selected image container 302 (shown as 302b), and dragged the handle 315e via the mouse to the position shown, resulting in the image container 302 having size and shape as shown (indicated as 302c). As illustrated, the top portion of the image content displayed in container 302b is cropped off in the resulting image container 302c, yet the scaling and magnification of the image content remains the same. Note also that the cropping window 412 in the image pane 410 is updated to reflect the change in dimensions of the image container 302, and maintains the same aspect ratio as the modified image container 302c. The portion of the base image 411 captured by the updated cropping window 412 corresponds to the image content displayed in the modified image container 302c.

Figure 11B:
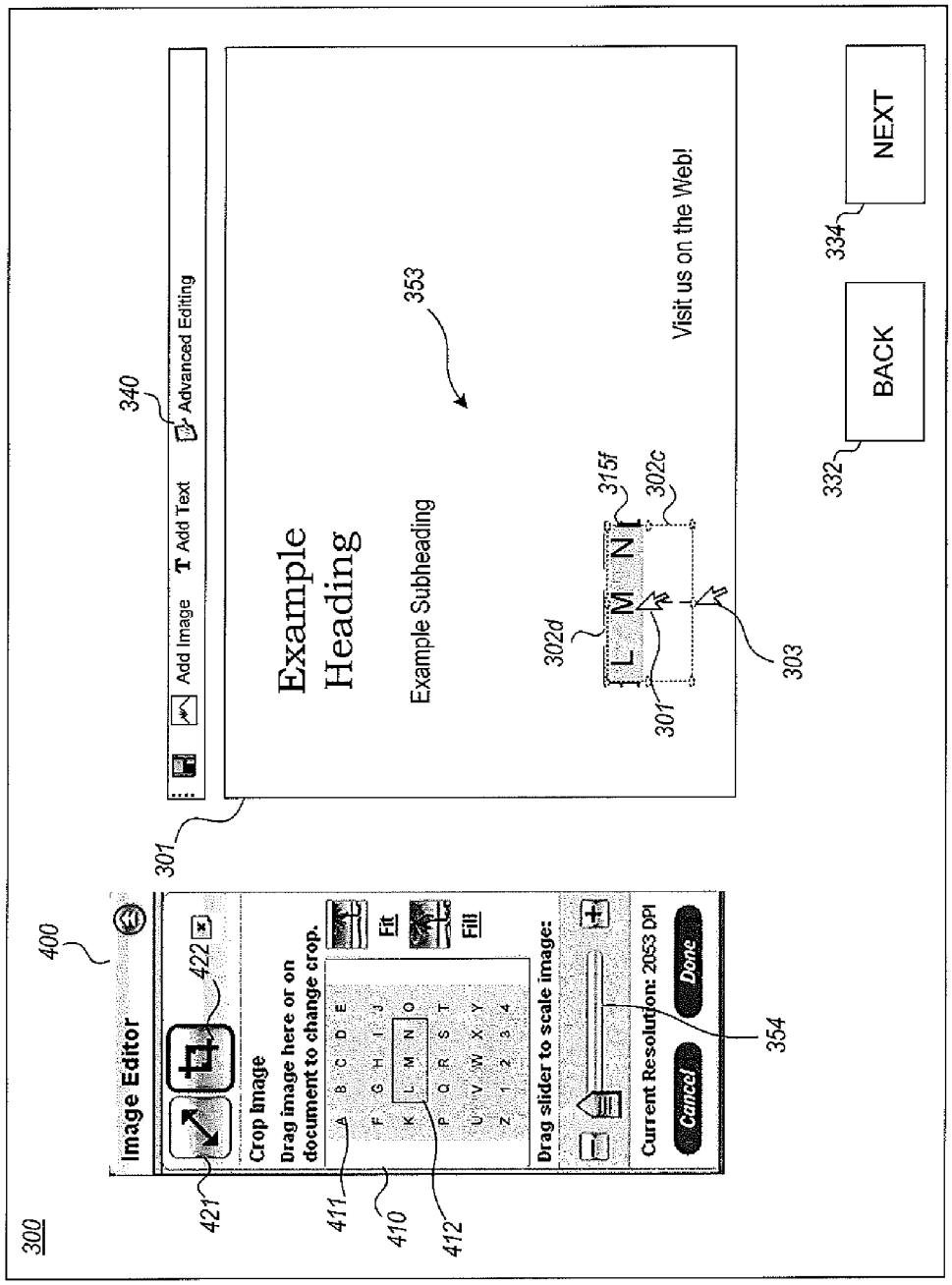

Continuing with this example, FIG. 11B shows the product design screen after the user has selected the drag handle 315g positioned at the midpoint of the bottom horizontal boundary section of the selected image container 302 (shown as 302c), and dragged the handle 315g via the mouse to the position shown, resulting in the image container 302 having size and shape as shown (indicated as 302d). As illustrated, the bottom portion of the image content displayed in container 302c is cropped off in the resulting image container 302d, yet again the scaling and magnification of the image content remains the same. Again, the cropping window 412 in the image pane 410 is updated to reflect the change in dimensions of the image container 302, and maintains the same aspect ratio as the modified image container 302d. The portion of the base image 411 captured by the updated cropping window 412 corresponds to the image content displayed in the modified image container 302d.

Figure 11C:
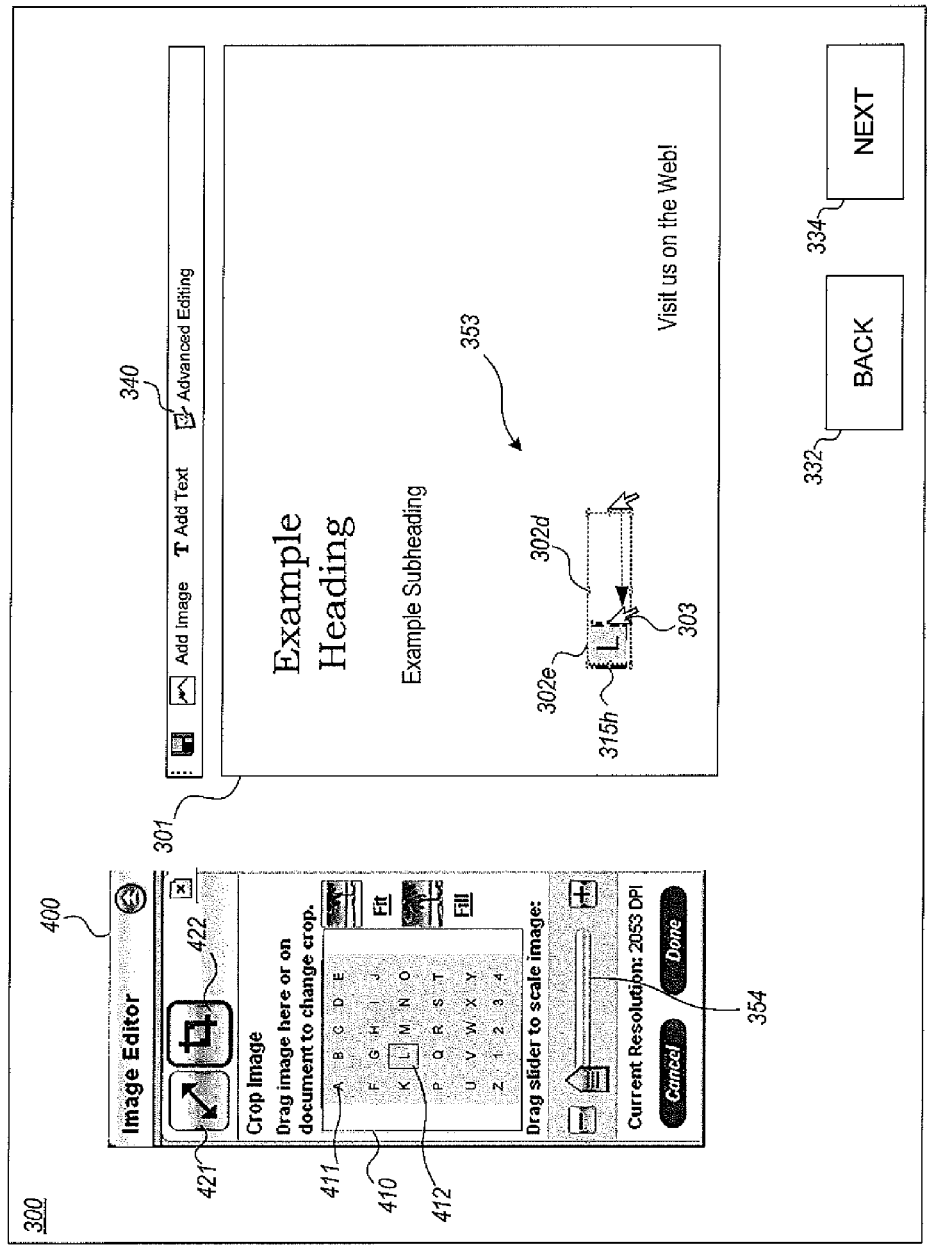

In FIG. 11C, the image is further cropped, this time by dragging the handle 315f on the right vertical boundary section of image container 302d to the left, resulting in the image container 302 having size and shape as shown (indicated as 302e). Again, the scaling and magnification of the image content remains the same even as the right portion of the image content displayed in container 302c is cropped off. Again, the cropping window 412 in the image pane 410 is updated to reflect the change in dimensions of the image container 302, and maintains the same aspect ratio as the modified image container 302e. The portion of the base image 411 captured by the updated cropping window 412 corresponds to the image content displayed in the modified image container 302e.

The handle 315h on the left vertical boundary section of image container 302 operates similarly and may be dragged to the right or to the left to move the left vertical boundary section to the right or left, as desired. It is to be understood that the vertical boundary sections may be moved right or left using the handles connected thereto, and the horizontal boundaries may be moved up or down using the handles connected thereto. The remaining corner handles 315a, 315b, 315c, 315d each connect to both a horizontal drag handle and a vertical drag handle. When these handles are selected and dragged, the connected horizontal and vertical boundary sections are simultaneously moved out or in.

Figure 12:
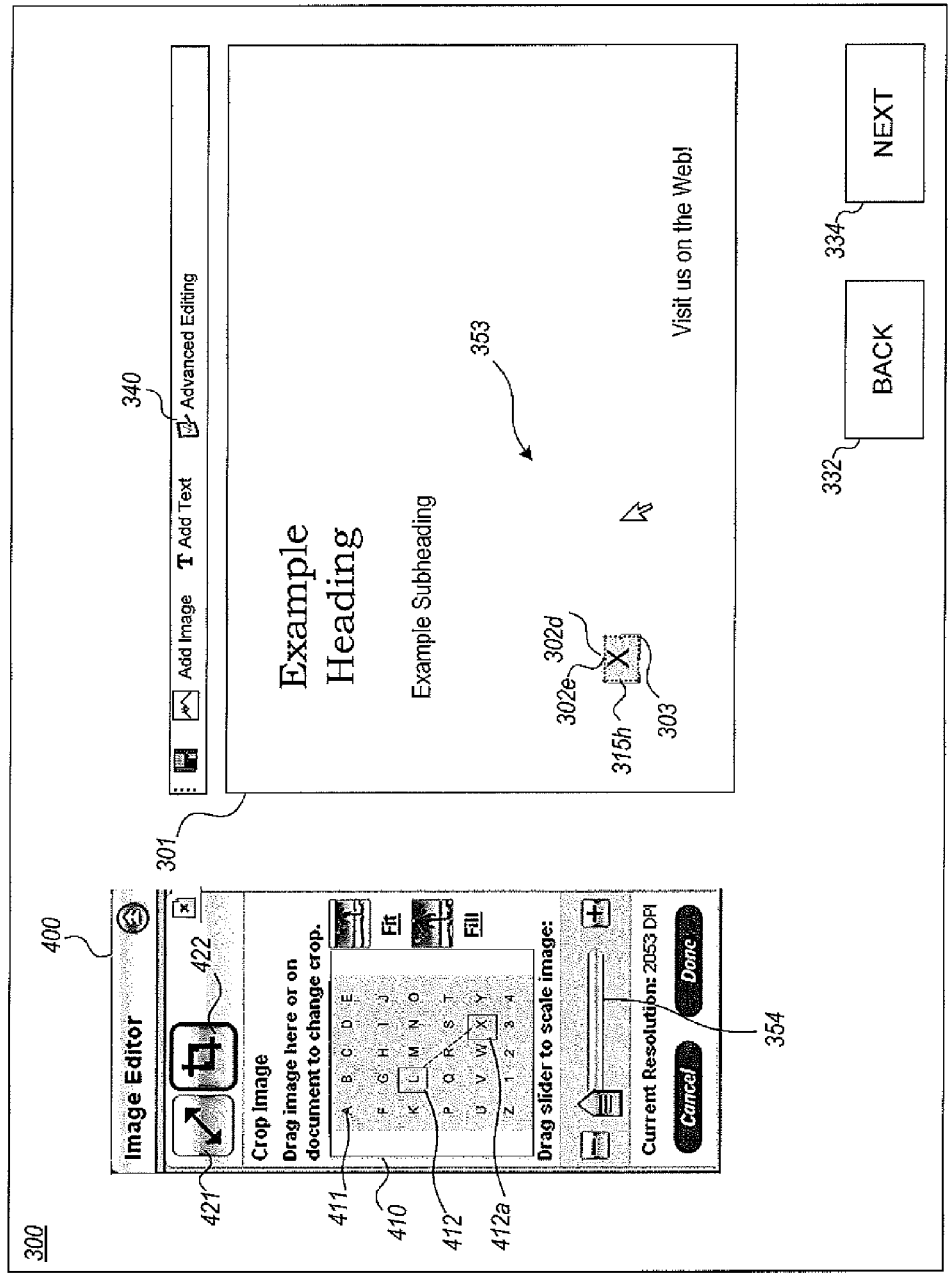

The Crop tool 353 also includes an active control in the image pane 410 to allow the user to modify the position and dimensions of the cropping window 412 from the image pane 410. In this regard, the active control may include a cropping window placement control, for example activated by clicking within the cropping window 412 in the image pane 410 to select the cropping window and then operating according to a standard drag-and-drop operation to allow the user to pick and move the position of the cropping window 412 over the base image 411 displayed in the image pane 410. For example, FIG. 12 illustrates the position of the cropping window 412 (show as 412a) after the user has performed a drag-and-drop operation on the cropping window 412 from its position as shown in FIG. 11C.

Although not shown, the Crop tool active controls in the image pane 410 may also include drag handles connected to the cropping window 412 in the image pane 410 which allow a user to drag-and-drop boundaries of the cropping window 412 to modify the size and shape of the cropping window 412 from the image pane 410. This operation would operate similarly to Crop tool's active control in the product design template 301, but would be active in the image pane 410 and associated with the cropping window 412 rather than the image container 302.

In an embodiment, when the cropping window 412 is repositioned in a drag-and-drop operation using the active placement control in the image pane 410, the boundaries of the cropping window 412 are limited to the outer boundaries of the base image 411. Thus, if the cropping window 412 is dragged such that one of its edges reaches the outer boundary of the underlying base image 411, it cannot be dragged past that edge.

Figure 13:
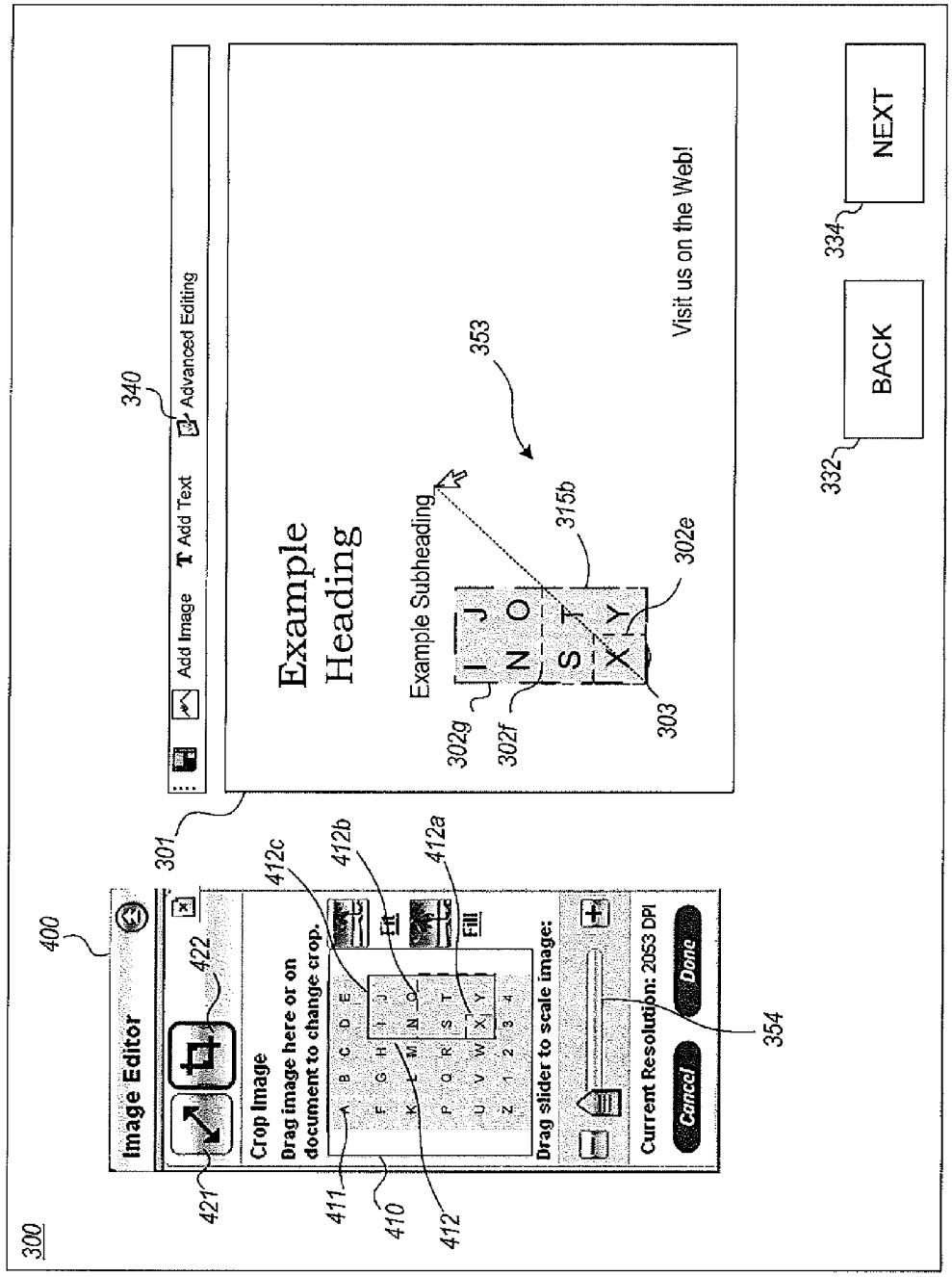

In an embodiment, when the cropping window 412 is reshaped using the active control on the image container 302 in the product design template 301 (by selecting a boundary on the image container 302 and performing a drag-and-drop operation such that an edge of the resulting modified cropping window reaches an edge of the base image 411 in the image pane 410), the edge of the cropping window is limited to the edge of the base image 411 and the corresponding selected boundary of the image container 302 cannot be expanded further. If more than one boundary is selected and dragged simultaneously, when a first boundary of the corresponding cropping window 412 reaches an edge of the base image 411 in the image pane 410, the crop tool 353 may limit the first boundary of the cropping window 412 to that edge but allow further expansion on the remaining boundaries as long as and until the remaining boundary reaches another edge of the base image 411. As an example, FIG. 13 illustrates the expansion of the cropping window (from 412a to 412c) through the selection of a corner handle control 315b on the image container 302 when image editor tool 400 is in the Crop and Magnify mode. As illustrated, as the image container 302 is expanded outward, the resulting cropping window 412a in the image pane 410 approaches the left edge of the base image 411. When the resulting cropping window 412 reaches the left edge (indicated at 412b when the image container is as indicated at 302f) and the cursor movement continues to drag outward, the cropping window 412 hugs the left edge of the base image 411 (indicated at 412c when the image container is as indicated at 302g) yet allows the top horizontal boundary to continue to expand upward until it reaches the top edge of the base image 411, where further upward expansion prevented.

Figure 14A:
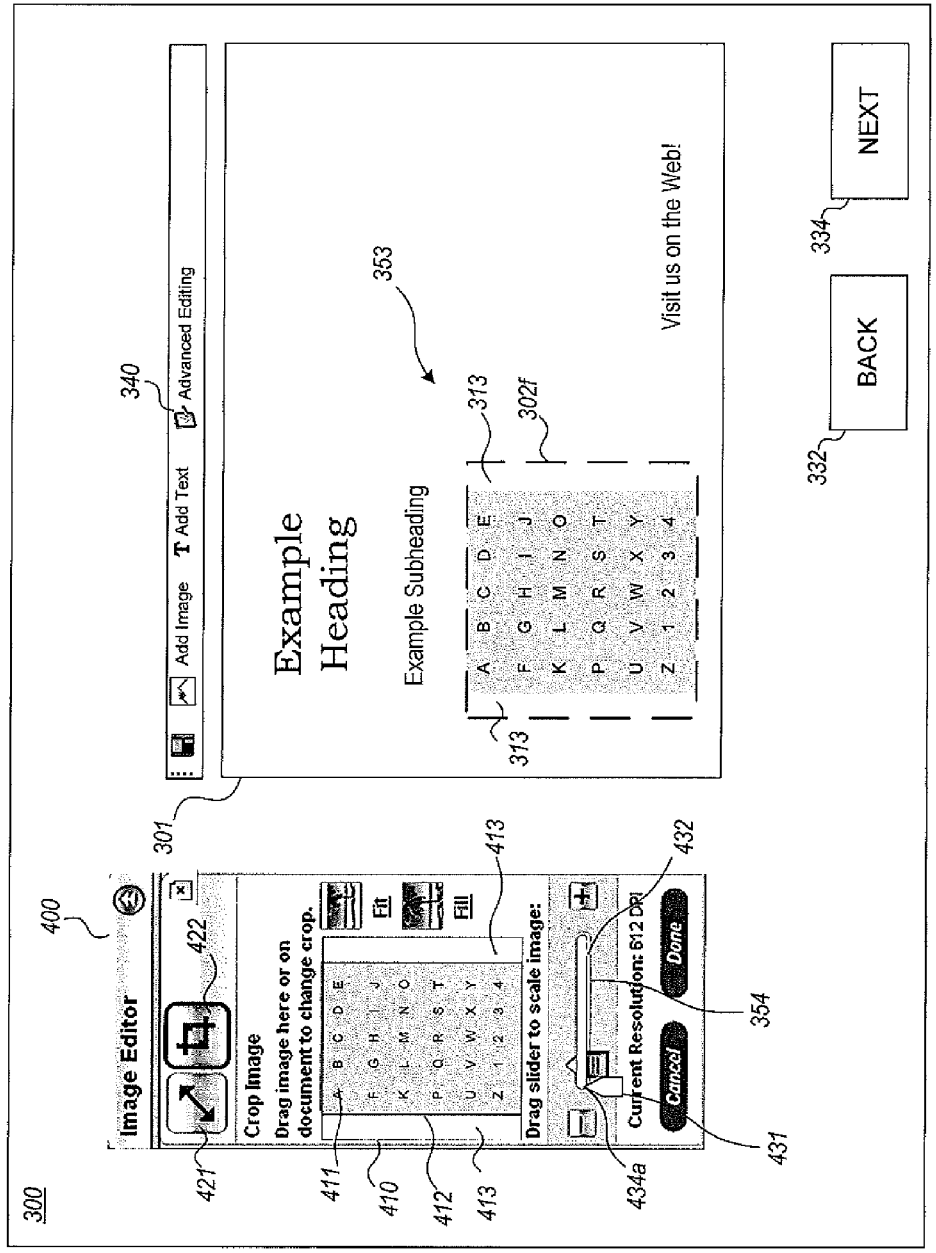

FIG. 14A illustrates the customization window 300 upon selection by the user of the Magnify tool 354 in the image editor tool 400. In the embodiment shown, the Magnify tool 354 is implemented as a slider 431 which may be dragged to any position along a slide 432 to change the magnification of the image content in the cropping window 412 and simultaneously in the selected image container 302 displayed in the product design template 301. The location of the slider 431 along the slide 432 indicates and determines the degree of magnification of the image content in the selected image container 302. In an embodiment, the range of magnification ranges from full negative cropping to a maximum magnification of 100 dots per inch (DPI).

FIG. 14A illustrates full negative cropping, wherein the slider 431 is on the far left end of the slide 432. Full negative cropping occurs when the base image 411 is scaled to fit the image container 302 and thus, unless the dimensions of the base image 411 have the same aspect ratio as the dimensions of the image container 302, the portions of the image container 302 not filled by the image 411 are filled with transparent overlays 313. Of course, the image container 302 (indicated as 302h) most likely will not have the same aspect ratio as the image pane 410 so the transparent overlays 313 would not have the same aspect ratio as the transparent overlays 413 displayed in the image pane 410.

Figure 14B:
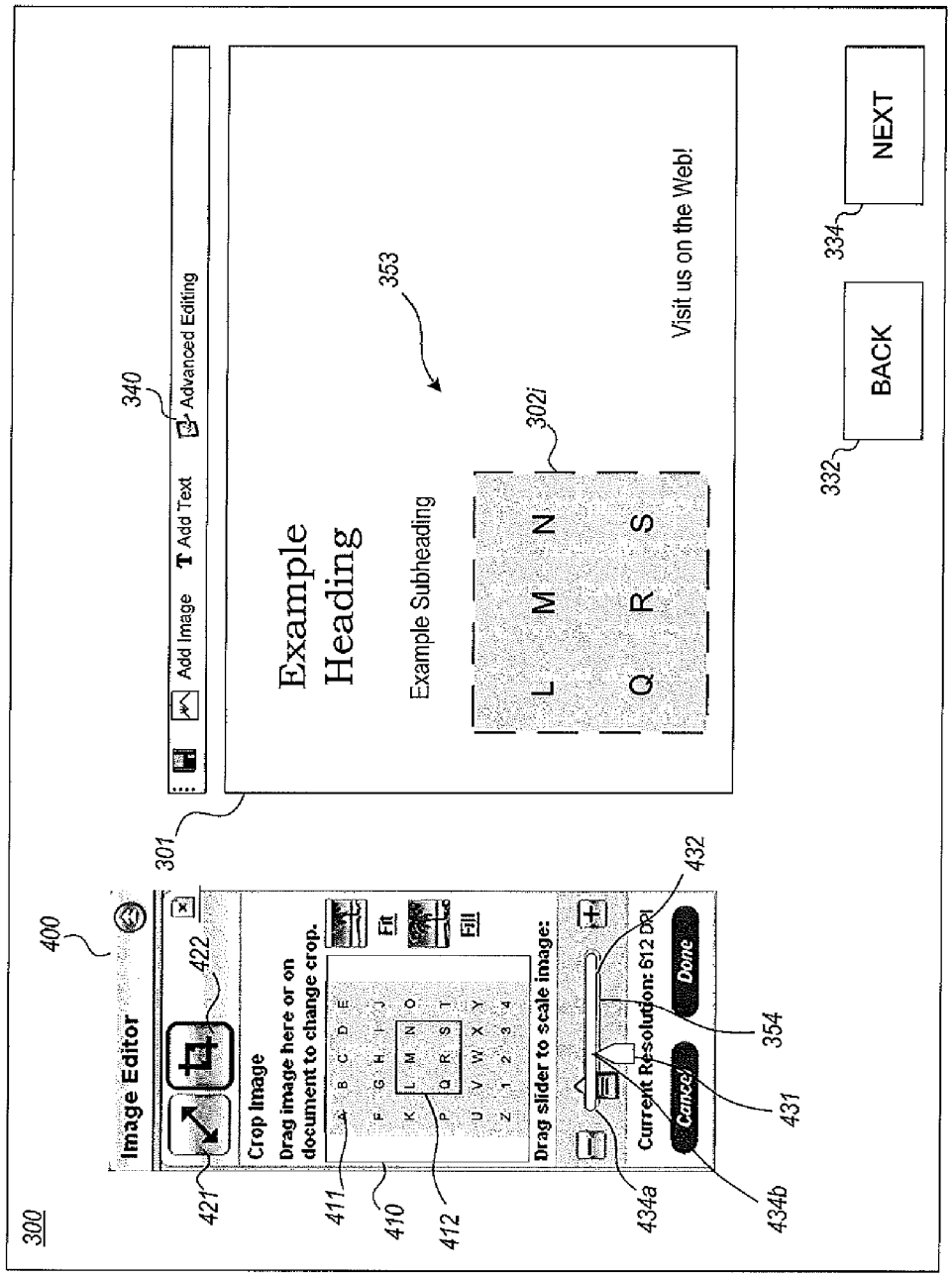
Figure 14C:
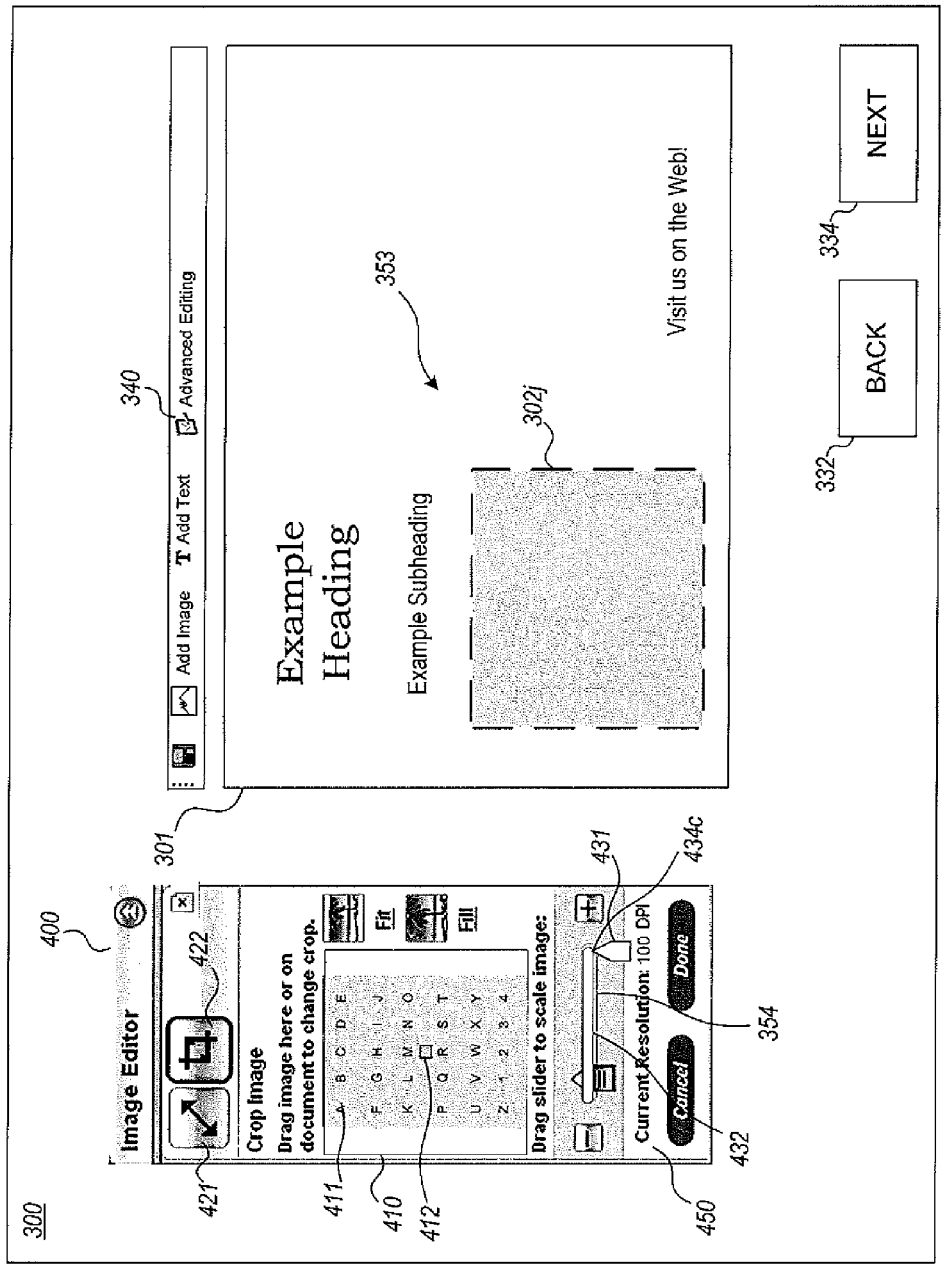

FIG. 14B illustrates some magnification, wherein the slider 431 is positioned between the far left and far right points of the slide 432, and FIG. 14C illustrates maximum magnification, wherein the slider 431 is positioned on the far right end of the slide 432. It will be appreciated that the range of available magnification is a function of the pixel density of the image 411.

FIG. 14B shows that the slider 431 has been dragged from its original location on the far left end of the slide 432 (indicated at 434a) which corresponds to full negative cropping (i.e., "scale to fit the image container") as illustrated in FIG. 14A, to the location indicated at 434b. When the slider 431 is dragged along the slide 432, the Magnify tool 354 responds by automatically resizing the cropping window 412 in the image pane 410 to a smaller size (preferably proportional to the position of the slider 431 along the slide 432) while maintaining the center point of the image content in the image container 302 and maintaining the aspect ratio of the cropping window 412 and corresponding image container 302. Since the image container 302 itself does not change in size or dimension during utilization of the Magnify tool 354, the image content captured within the boundaries of the cropping window 412 is automatically resealed and displayed in the selected image container 302 while maintaining the aspect ratio of the cropping window 412 and image container 302. These actions are performed automatically by the image editing tool 400 upon detection of user input indicating a change in magnification. That is, upon detection of a user's desire to change the magnification (by way of a detection of a drag operation on the slider 431 by the user), the system automatically determines the degree of magnification corresponding to the updated position of the slider 431, determines the corresponding resolution required to achieve the degree of magnification, determines the dimensions of the cropping window 412 corresponding to the determined resolution as required to maintain the aspect ratio of the cropping window 412 and image container 302, displays the cropping window 412 according to the determined dimensions, and displays the image content captured by the adjusted cropping window 412 in the image container 302 at the selected resolution. A typical embodiment of the Magnify tool 3543 written in Java® script, appears in Appendix A.

Thus, in FIG. 14B, the desired change in magnification resulting from the dragging of the slider 431 from position 434a to position 434b results in automatic resizing of the cropping window 412 to the correspondingly smaller size, as illustrated. Note that the current resolution in this example is displayed as having decreased from the original 2000 DPI down to 612 DPI after the change in magnification. Note also that in magnifying a small portion of the image in this way, a smaller detail of the base image 411 may be enlarged to become more visible to the user. For example, in FIG. 14B, the image content of the selected image container 302g (shown as 302f in FIG. 14A) is magnified to reveal more detail that may have not been visible to the user at the previous magnification level.

FIG. 14C illustrates the image container 302 (shown as 302k) when the slider is moved as far to right as allowed (indicated at position 434c on the slide 432) to further increase the magnification of the image content of the selected image container 302g. In this example, the additional magnification seen in container 302g may reveal further detail in the selected portion of the base image 411.

Figure 14D:
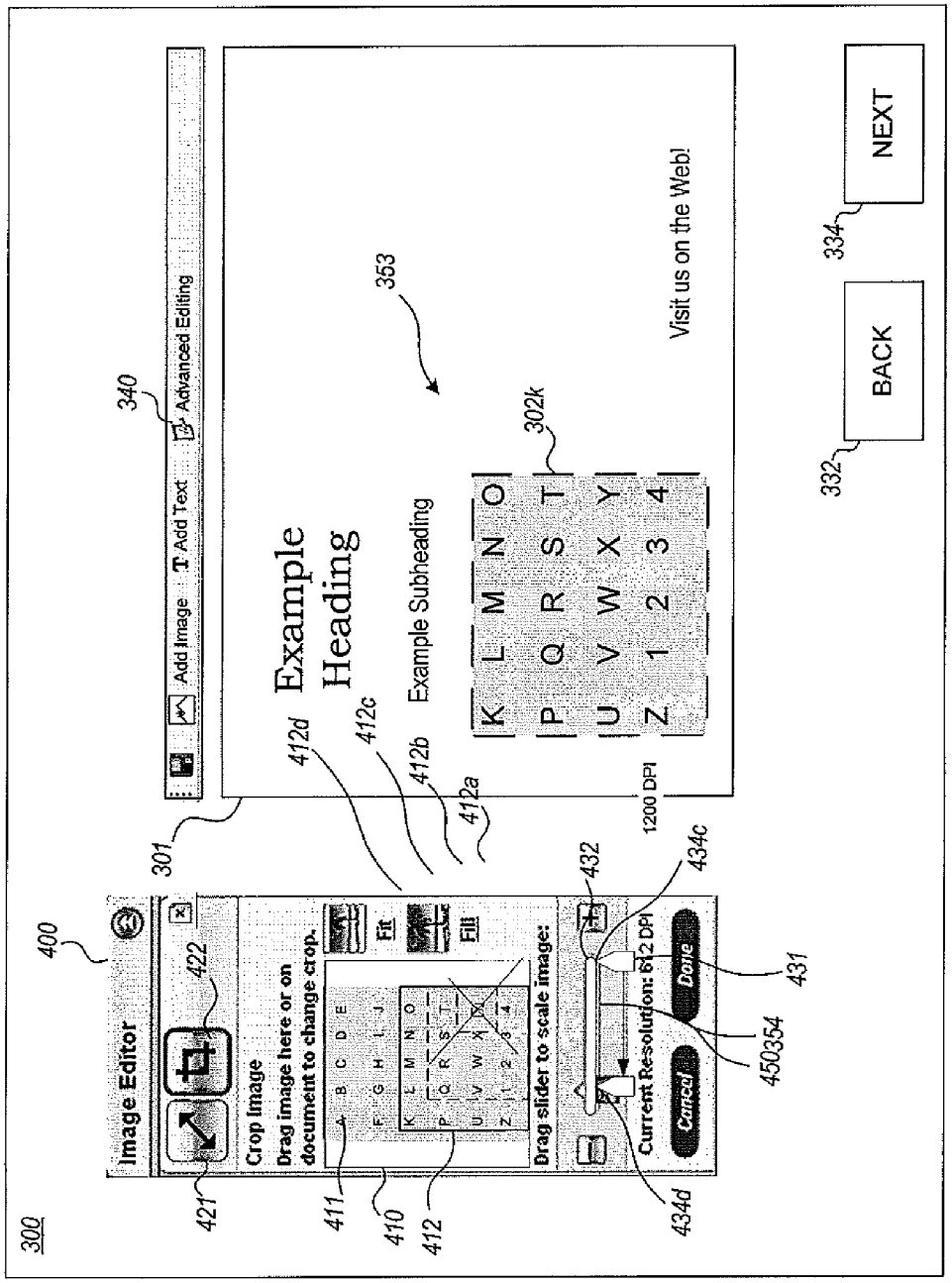

FIG. 14D illustrates changes in the cropping window 412 resulting from a change in position of the slider 431 along the slide 432 from a higher magnification level to a lower magnification level. In this example, the cropping window 412 begins with an initial size (indicated as 412a) and expands while maintaining its aspect ratio until one of the boundaries of the cropping window 412 reaches a boundary of the base image 411 (for example, the right boundary of the cropping window indicated at 412b). Once this happens, the cropping window 412 continues to expand as the magnification decreases (as a result of the slider 431 moving to the left) but the boundaries of the cropping window 412 are not allowed to expand past the corresponding boundaries of the base image 411. Thus, as the slider 431 is further moved to the left, the right boundary of the cropping window 412 remains at the right boundary of the image, but the remaining boundaries are allowed to continue to expand. As the bottom boundary reaches the bottom boundary of the base image, indicated at 412c, the bottom boundary of the cropping window 412 remains at the bottom boundary of the base image 411 while the remaining left and top boundaries of the cropping window continue to expand, indicated at 412d. The edge limitation feature of the Crop tool 353 has the additional advantage of providing seamless integration between positive and negative cropping. A typical embodiment of this seamless cropping tool 354, written in Java® script, appears in Appendix C.

It will be appreciated by those skilled in digital imaging techniques that the magnification technique provided by the Magnify tool 354 must be balanced against the decrease in resolution which results from the magnification. That is, because the base image 411 is made of a discrete number of pixels, when the cropping window 412 is made smaller to select a smaller number of the overall limited number of pixels of the base image 411, these smaller number of selected pixels are scaled to fit within the dimensions of the unchanged image container 302 to make the content of the selected pixels more visible to the user. However, because there are fewer actual pixels selected, the actual image content is decreased as the magnification is increased.

For this reason, the image editor tool 400 may include a Resolution indicator 450 which monitors the current resolution of the selected image container 302 and may generate a warning to the user if the current resolution dips below a predetermined minimum threshold. This may be important to a user whose product design is to be used in applications that require the image content to be of a certain minimum resolution, or which simply look better when the image content to be of a certain minimum resolution. For example, if the finalized product is to be printed, it is generally thought that printed material looks better with a minimum resolution of approximately 300 DPI. Therefore, in an embodiment, the Resolution indicator 450 may generate a warning at 75% of the lowest desired DPI (i.e., at 225 DPI). Certain printers may not allow resolutions below this level, and therefore, if the user is provided with an indicator that the current resolution is below a given threshold, the user is then provided with the opportunity to increase the magnification to prevent this problem in the final product.

Figure 15A:
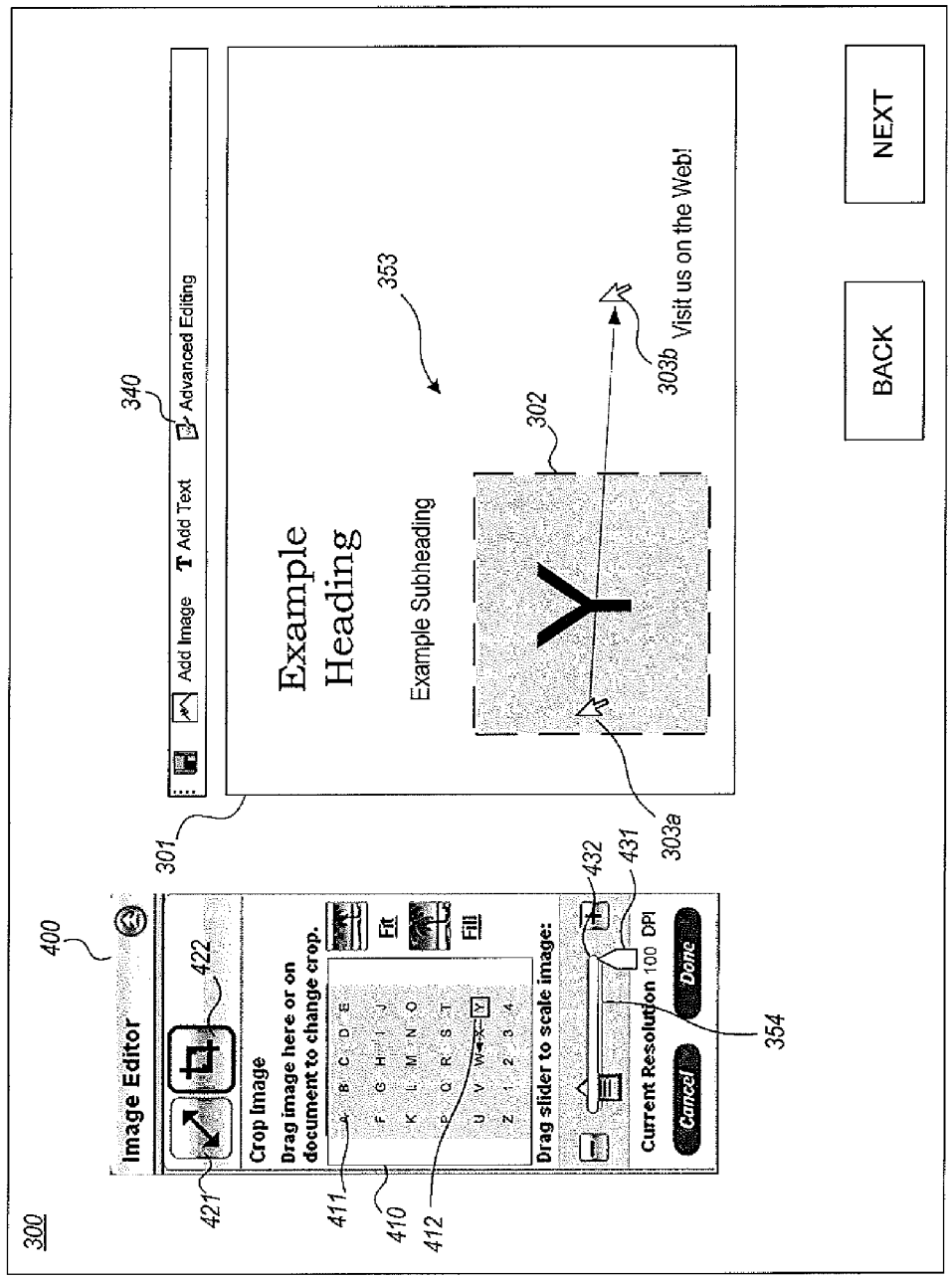
Figure 15B:
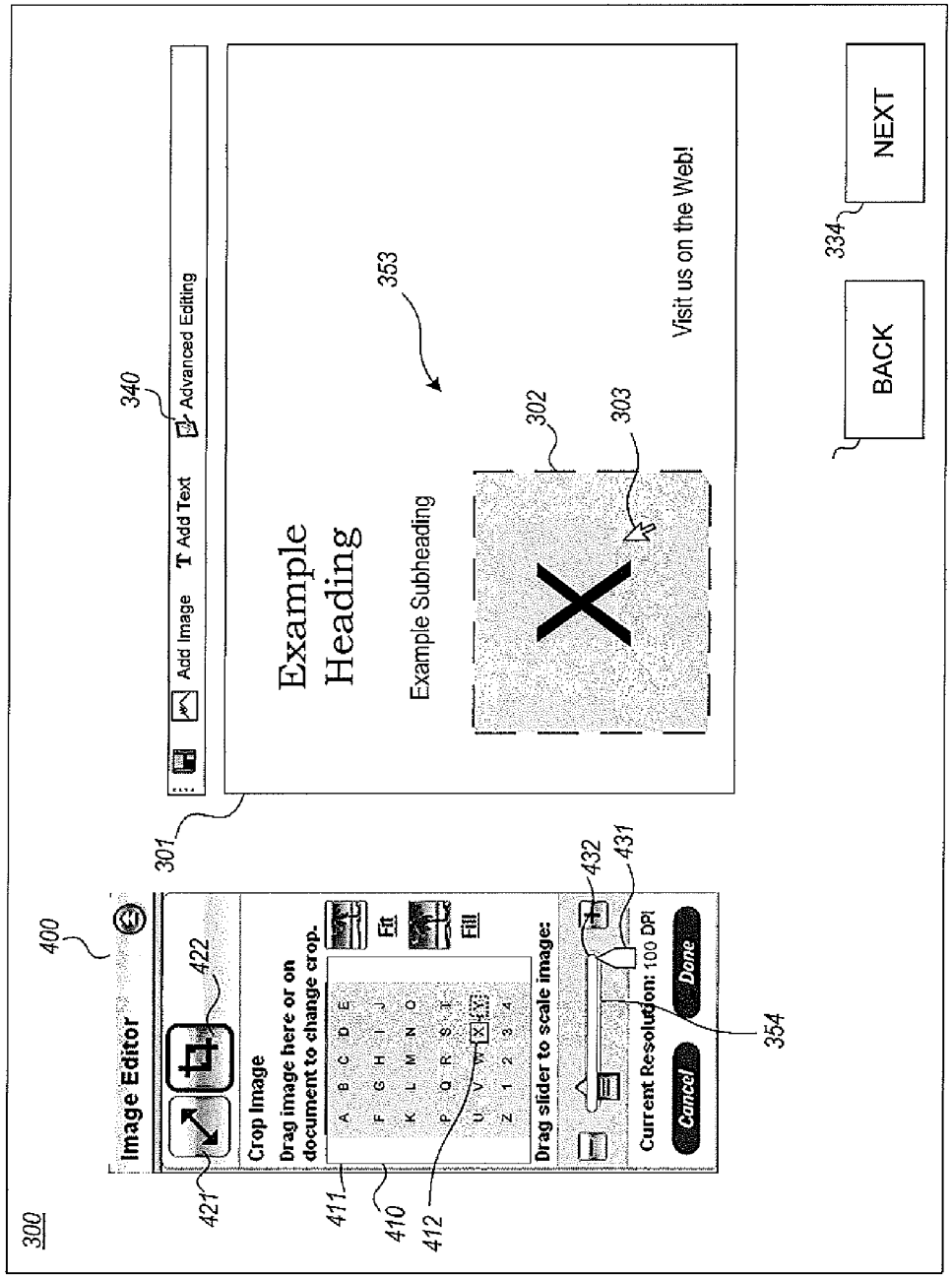

In both the Crop tool 353 and the Magnify tool 354, the image editor tool 400 may provide the user with the additional flexibility of allowing adjustment of the placement of the cropping window 412 over the underlying base image 411 without changing the placement or size and dimensions of the image container. In an embodiment, illustrated in FIGS. 15A and 15B, the image editor tool 400 allows the user to click on the image content within the selected image container 302 in the product design template 301, and then drag the cursor 303 in the desired direction to pull the image content in the direction of the cursor. Thus, in FIG. 15A, the user clicks on the image content in image container 302 and drags the cursor 303 from a position 303a to a position 303b, as indicated in FIG. 15A, resulting in the adjustment of the image content to that shown in FIG. 15B. In this operation, it appears to the user as if the user is essentially "sliding" the underlying base image 411 around underneath the image container 302 until the desired portion of the image appears in the image container 302. However, in implementation, the Crop tool 353 responds to the user's cursor movements within the boundaries of the image container 302 to adjust the position of the cropping window 412 over the base image 411 in the image pane 410 of the image editor tool 400. Thus, the user can simultaneously see the changes in the position of the cropping window 412 when dragging the image content in the image container 302 to adjust the placement of the image in the image container 302. A typical embodiment of this cropping window placement tool, written in Java® script, appears in Appendix C.

Figure 16:
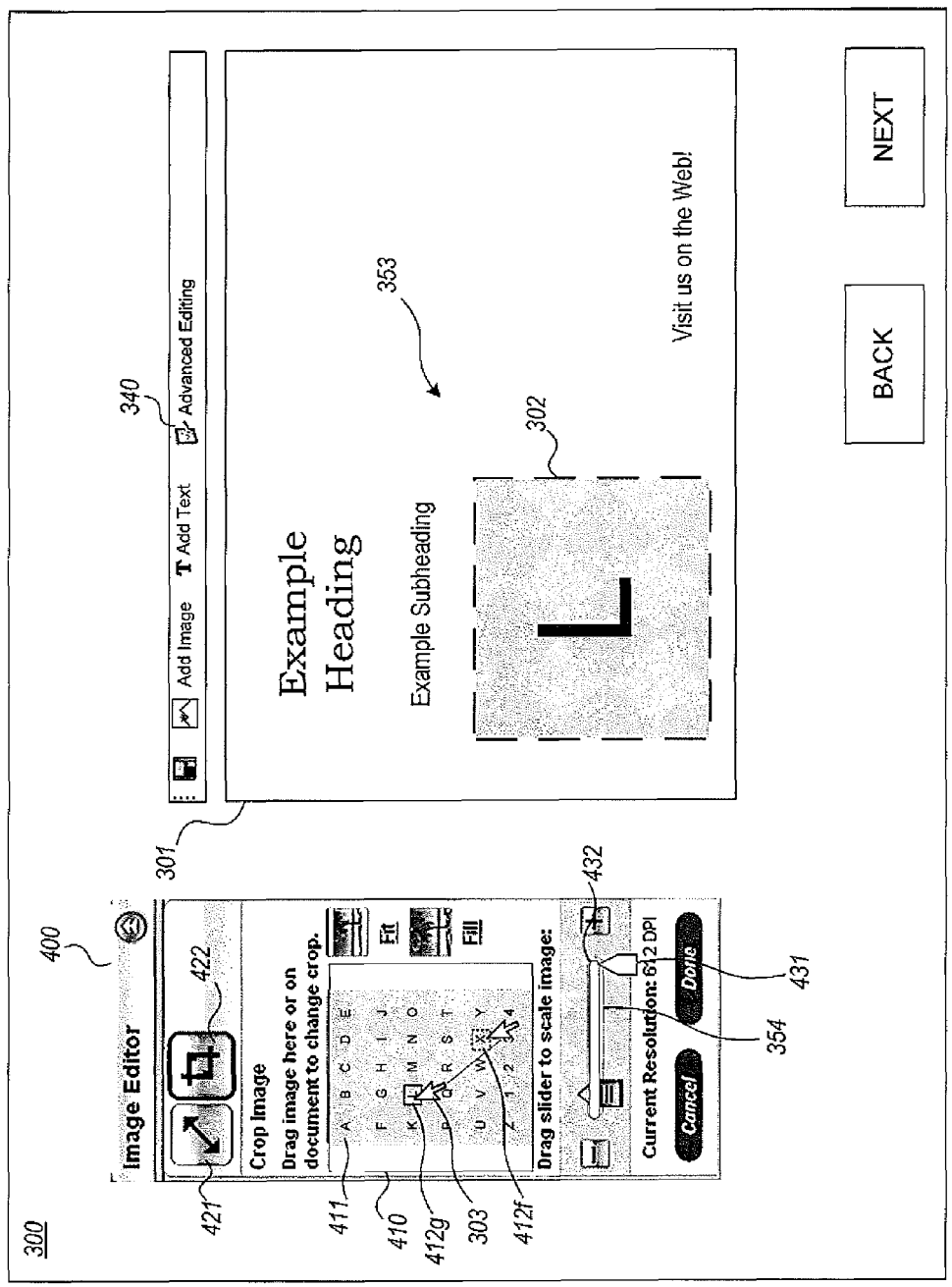

To achieve the same result, illustrated in FIG. 16, the user may alternatively select the cropping window 412 in the image pane 410 and drag-and-drop it as desired to place the cropping window 412 over the desired image content. Thus, as shown in FIG. 16, the user has selected the cropping window 412 (indicated as 412f) and dragged to another position (indicated as 412g), and the content of the image container 302 is correspondingly updated.

In either of the operations shown in FIGS. 15A/15B and 16, the results are updated in both the product design template 301 and the image pane 410 simultaneously. It will further be appreciated that while performing a drag-and-drop of the image content within the image container 302 of FIGS. 15A/15B and performing a drag-and-drop of the cropping window 412 over the base image 411 in the image pane 410 of FIG. 16 yield identical results, each offers a different advantage to the user. The operation illustrated in FIGS. 15A/15B offers the user image placement adjustment from the product design context, whereas the operation illustrated in FIG. 16 offers the user the same adjustment from the image context.

Figure 17:
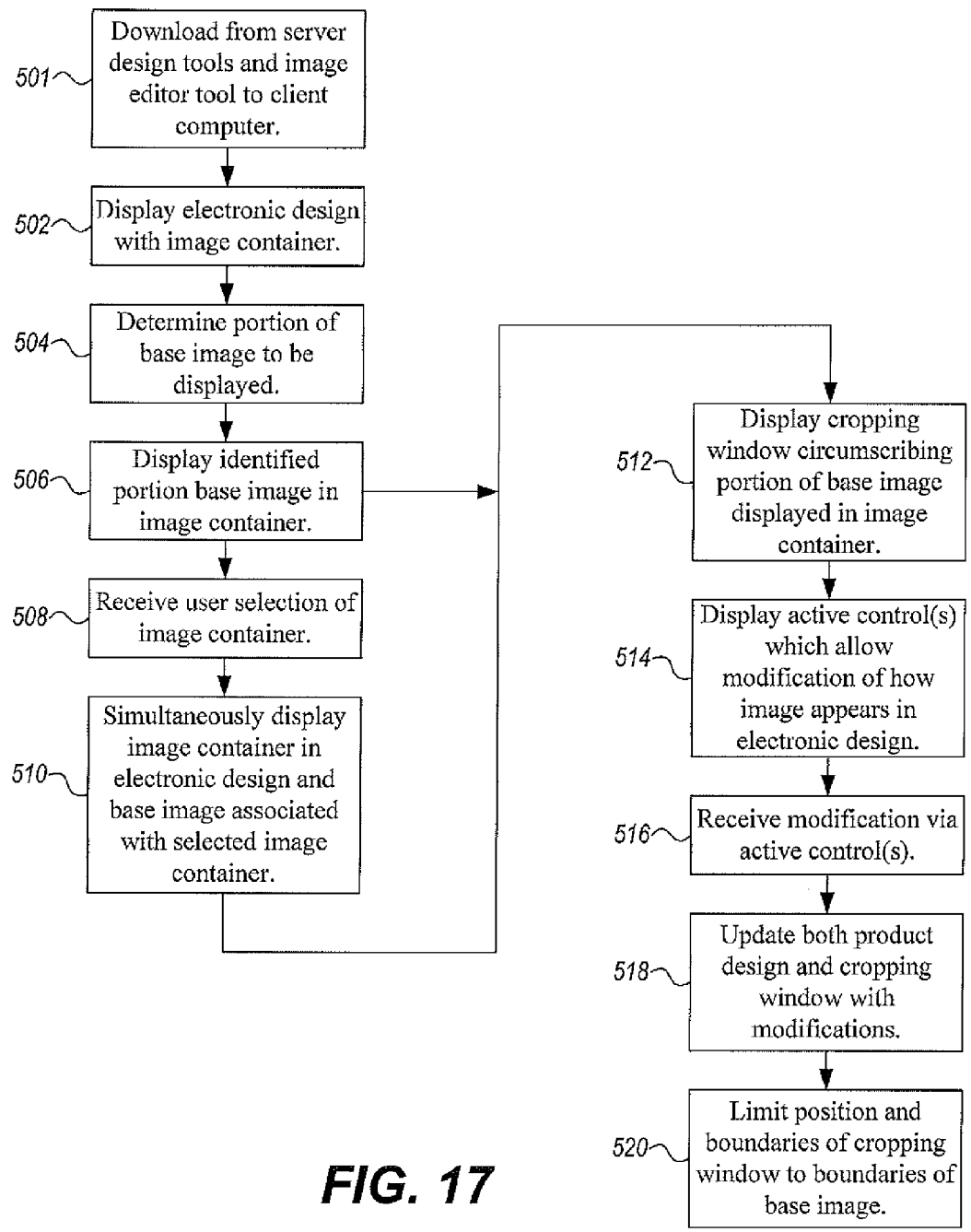
FIG. 17 is a flowchart of an exemplary embodiment of a computer-implemented method.

FIG. 17 illustrates an embodiment of a computer-implemented method for facilitating user customization of the image content of an image container in an electronic design. In performing the method, a computer executes program code which is embodied on one or more computer readable media and which instructs the computer to perform the various steps of the method 500. Turning now to the steps of the method, a computer performs the steps of displaying an electronic design having at least one image container on a screen of a user's computer wherein the at least one image container has associated with it a corresponding base image (step 502), determining a portion of the base image to be displayed in the image container (step 504), displaying the identified portion of the base image in the image container (step 506), receiving user selection of an image container from the electronic design for customization (step 508), and displaying to the user, simultaneously with the electronic design, an image pane displaying the entire base image associated with the selected image container (step 510), thereby allowing the user to simultaneously view both the base image associated with the selected image container and the portion of the base image appearing in the electronic design within the context of the electronic design.

The computer may perform the further steps of displaying a cropping window circumscribing the portion of the base image that is displayed in the selected image container (step 512), displaying at least one active control which allows modification of how the base image, or portion thereof, appears in the electronic design (step 514), receiving user modification via the at least one active control (step 516), and simultaneously updating the display of both the product design and the cropping window with modifications to the appearance of the base image or the portion thereof as the modifications are made using the at least one active control (step 518), preferably limiting the position and boundaries of the cropping window to within the boundaries of the base image (step 520).

While an illustrative embodiment has been discussed, alternate embodiments may also be employed. For example, while the invention has been described in a Web-based environment, it is not so limited. Therefore, the described embodiments are to be considered as illustrative rather than restrictive and the scope of the invention is as indicated in the following claims and all equivalent methods and systems.

APPENDIX A

```
// Magnifying while keeping the center point //
    // get zoom percent from new slider value (width)
        var zoomPercentDelta = (newWidth / my.zoomStartRect.width) − 1;
        // new size + position
        var mainImage = { };
        // calculate new sizes
        // -> add side deltas to dimensions
        mainImage.width = my.zoomStartRect.width + zoomPercentDelta *
my.zoomStartRect.width;
        mainImage.height = my.zoomStartRect.height + zoomPercentDelta *
my.zoomStartRect.height;
        // calculate new position
        // -> preserve center point of image!
        var mainCropArea = vp.ui.getLocalRect(my.mainCropArea); //
container
        // center % = where is the container's center point on the whole
image
        //      =image distance to container center / total image size
        //      =(crop area size / 2 − image offset) / total image size
        var heightCenterPercent = ((mainCropArea.height / 2) −
my.zoomStartRect.top) /my.zoomStartRect.height;
        var widthCenterPercent = ((mainCropArea.width / 2) −
my.zoomStartRect.left) /my.zoomStartRect.width;
        // calculate new position, keeping center %s constant
        mainImage.top = (mainCropArea.height / 2) − (mainImage.height *
heightCenterPercent);
        mainImage.left = (mainCropArea.width / 2) − (mainImage.width *
widthCenterPercent);
```

APPENDIX B

```
    // Magnifying while hugging edges (for smooth transition to negative
        cropping)//
    var mainArea = vp.ui.getLocalRect(my.mainCropArea);
// image container (is the crop area)
    var mainImage = vp.ui.getLocalRect(my.mainCropImage);
// full image (is bounding box for crop area)
    // bounds checks vertical
    if (mainImage.top > 0)
    {
        mainImage.top = 0;
    }
    else if (mainImage.bottom < mainArea.height)
    {
        mainImage.top = mainArea.height − mainImage.height;
    }
```

APPENDIX B-continued

```
    // bounds checks horizontal
    if (mainImage.left > 0)
    {
        mainImage.left = 0;
    }
    else if (mainImage.right < mainArea.width)
    {
        mainImage.left = mainArea.width − mainImage.width;
    }
    // negative-cropping centering
    // maintain invariant:
    // if negatively cropped in a dimension, then:
    // - image is centered in that dimension
    // - other dimension never has white space on a side
    if (mainImage.width < mainArea.width)
    {
        mainImage.left = (mainArea.width − mainImage.width) / 2;
    }
    if (mainImage.height < mainArea.height)
    {
        mainImage.top = (mainArea.height − mainImage.height) / 2;
    }
```

APPENDIX C

```
    // Adjusting the crop container's bounding box to be the actual,
    possibly hidden position of the image //
        // find current image + container
        var mainArea = vp.ui.getLocalRect(my.mainCropArea); // image
container (is the crop area)
        var mainImage = vp.ui.getLocalRect(my.mainCropImage); // full
image (is bounding box for crop area)
        // make image coordinates absolute with container
        mainImage.top = mainImage.top + mainArea.top;
        mainImage.left = mainImage.left + mainArea.left;
        // deal with negative cropping
        // invariant: if negatively cropped in a dimension, then image
is centered in that dimension
        if (mainImage.width < mainArea.width)
        {
            // restrict resizing - this is the max zoom
            mainImage.left = mainArea.left;
            mainImage.width = mainArea.width;
        }
        if (mainImage.height < mainArea.height)
        {
            // restrict resizing - this is the max zoom
            mainImage.top = mainArea.top;
            mainImage.height = mainArea.height;
        }
        my.mainCropManipulator.setBoundingBox(mainImage);
```

What is claimed is:

1. A computer-implemented method for facilitating user customization of the image content of an image container in an electronic design, the method comprising
displaying in a customization window an electronic design to a user, the design comprising at least one image container, the at least one image container associated with a corresponding base image and displaying a cropped version of the image corresponding to a portion of the base image therein;
allowing the user to select an image container from the electronic design displayed in the customization window;
upon user selection of an image container, displaying to the user, simultaneously with the electronic design in the customization window, an image pane displaying the entire base image associated with the selected image container;
providing at least one active control allowing to modify the image container in the electronic design and simultaneously updating the image pane with corresponding modifications to the appearance of the base image or the portion thereof as the modifications are made using the at least one active control, thereby allowing the user to simultaneously view both the base image associated with the selected image container and the portion of the base image corresponding to the cropped version of the image and appearing in the image container within the context of the electronic design.

2. The method of claim 1, the image pane further comprising a cropping window circumscribing the portion of the base image that is displayed in the selected image container; and the at least one active control further allowing to modify the cropping window in the image pane and simultaneously updating the electronic design with corresponding modifications to the appearance of the base image or the portion thereof as the modifications are made using the at least one active control.

3. The method of claim 2, further comprising producing a printed version of the modified electronic design.

4. The method of claim 3, the at least one active control comprising an image placement tool which allows the user to modify a position of the selected image container within the electronic design.

5. The method of claim 3, the at least one active control comprising an image scaling tool which allows the user to scale the selected image container to a proportionally different size.

6. The method of claim 2, the at least one active control comprising an image cropping tool which allows the user to control dimensions and position of the cropping window over the base image in the image pane to select the portion of the base image for display within the selected image container in the electronic design.

7. The method of claim 6, wherein the position of the cropping window is limited to the boundaries of the base image in the image pane.

8. The method of claim 6, the image cropping tool comprising an active control connected to the cropping window in the image pane which allows the user to modify dimensions of the cropping window to make corresponding modifications to dimensions of the image container in the electronic design.

9. The method of claim 8, wherein modifications of the dimensions of the cropping window are limited by the boundaries of the base image in the image pane.

10. The method of claim 6, the image cropping tool comprising an active control connected to the image container in the electronic design which allows the user to modify dimensions of the image container to make corresponding modifications to dimensions of the cropping window in the image pane.

11. The method of claim 10, wherein modifications of the dimensions of the image container are limited to limits on the resulting dimensions of the cropping window to the boundaries of the base image in the image pane.

12. The method of claim 6, the image cropping tool comprising an active control connected to the portion of the base image displayed within the image container of the electronic design which allows the user to modify a position of the cropping window in the image pane and to thereby modify the portion of the base image displayed within the image container of the electronic design.

13. The method of claim 12, wherein the position of the cropping window is limited to the boundaries of the base image in the image pane.

14. The method of claim 2, the at least one active control comprising an image magnification tool which allows the user to modify a magnification level of the portion of the base image displayed within the selected image container in the electronic design.

15. The method of claim 14, wherein the magnification level ranges between scaling the entire base image to fit within the selected image container and a predetermined minimum image resolution.

16. The method of claim 14, wherein an increase in magnification results in a corresponding decrease in the size of the cropping window.

17. One or more computer readable media tangibly embodying program instructions which, when executed by a computer, implement a method for facilitating user customization of the image content of an image container in an electronic design, the method comprising
displaying in a customization window an electronic design to a user, the design comprising at least one image container, the at least one image container associated with a corresponding base image and displaying a cropped version of the image corresponding to a portion of the base image therein;
allowing the user to select an image container from the electronic design displayed in the customization window;
receiving a user selection of an image container from the electronic design; and
displaying to the user, simultaneously with the electronic design in the customization window, an image pane displaying the entire base image associated with the selected image container;
providing at least one active control allowing to modify the image container in the electronic design and simultaneously updating the image pane with corresponding modifications to the appearance of the base image or the portion thereof as the modifications are made using the at least one active control, thereby allowing the user to simultaneously view both the base image associated with the selected image container and the portion of the base image corresponding to the cropped version of the image and appearing in the image container within the context of the electronic design.

18. The one or more computer readable media of claim 17, the image pane further comprising a cropping window circumscribing the portion of the base image that is displayed in the selected image container; and the at least one active control further allowing to modify the cropping window in the image pane and simultaneously updating the electronic design with corresponding modifications to the appearance of the base image or the portion thereof as the modifications are made using the at least one active control.

19. The one or more computer readable media of claim 18, the at least one active control comprising an image cropping tool which allows the user to control dimensions and position of the cropping window over the base image in the image pane to select the portion of the base image for display within the selected image container in the electronic design.

20. The one or more computer readable media of claim 19, the image cropping tool comprising an active control connected to the cropping window in the image pane which allows the user to modify a position of the cropping window in the image pane and to thereby modify the portion of the base image displayed within the image container of the electronic design.

21. The one or more computer readable media of claim 20, wherein the position of the cropping window is limited to the boundaries of the base image in the image pane.

22. The one or more computer readable media of claim 19, the image cropping tool comprising an active control connected to the cropping window in the image pane which allows the user to modify dimensions of the cropping window to make corresponding modifications to dimensions of the image container in the electronic design.

23. The one or more computer readable media of claim 22, wherein modifications of the dimensions of the cropping window are limited by the boundaries of the base image in the image pane.

24. The one or more computer readable media of claim 19, the image cropping tool comprising an active control connected to the image container in the electronic design which allows the user to modify dimensions of the image container to make corresponding modifications to dimensions of the cropping window in the image pane.

25. The one or more computer readable media of claim 24, wherein modifications of the dimensions of the image container are limited to limits on the resulting dimensions of the cropping window to the boundaries of the base image in the image pane.

26. The one or more computer readable media of claim 19, the image cropping tool comprising an active control connected to the portion of the base image displayed within the image container of the electronic design which allows the user to modify a position of the cropping window in the image pane and to thereby modify the portion of the base image displayed within the image container of the electronic design.

27. The one or more computer readable media of claim 26, wherein the position of the cropping window is limited to the boundaries of the base image in the image pane.

28. The one or more computer readable media of claim 18, the at least one active control comprising an image magnification tool which allows the user to modify a magnification level of the portion of the base image displayed within the selected image container in the electronic design.

29. The one or more computer readable media of claim 28, wherein the magnification level ranges between scaling the entire base image to fit within the selected image container and a predetermined minimum image resolution.

30. The computer program code of claim 28, wherein an increase in magnification results in a corresponding decrease in the size of the cropping window.

31. The one or more computer readable media of claim 18, the at least one active control comprising an image placement tool which allows the user to modify a position of the selected image container within the electronic design.

32. The one or more computer readable media of claim 18, the at least one active control comprising an image scaling tool which allows the user to scale the selected image container to a proportionally different size.

33. A system for facilitating user customization of the image content of an image container in an electronic design, the system comprising:
one or more processors; and
one or more computer readable media having embodied therein computer code which, when executed by the one or more processors, implements the method of claim 1.

34. A computer-implemented method for facilitating user customization of the image content of an image container in an electronic design, the method comprising:
downloading, by one or more processors, computer readable program instructions for facilitating user customization of the image content of an image container in an electronic design to a user computer for execution on the user computer, the computer readable program instructions including instructions for displaying in a customization window a cropped version of the image corresponding to an electronic design to a user, the design comprising at least one image container, the at least one image container associated with a corresponding base image and displaying a portion of the base image therein; allowing the user to select an image container from the electronic design for customization; displaying to the user, simultaneously with the electronic design, an image pane displaying the entire base image associated with the selected image container; providing at least one active control allowing to modify the image container in the electronic design and simultaneously updating the image pane with corresponding modifications to the appearance of the base image or the portion thereof as the modifications are made using the at least one active control, thereby allowing the user to simultaneously view both the base image associated with the selected image container and the portion of the base image appearing in the electronic design within the context of the electronic design.

35. A system for facilitating user customization of the image content of an image container in an electronic design, the system comprising:
one or more processors; and
one or more computer readable media having embodied therein computer code which, when executed by the one or more processors, implements the method of claim 34.

* * * * *